US011214707B2

(12) United States Patent
Nowak et al.

(10) Patent No.: US 11,214,707 B2
(45) Date of Patent: Jan. 4, 2022

(54) COMPOSITIONS AND METHODS FOR FABRICATING COATINGS

(71) Applicant: THE BOEING COMPANY, Chicago, IL (US)

(72) Inventors: Andrew P. Nowak, Los Angeles, CA (US); April R. Rodriguez, Santa Monica, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/138,718

(22) Filed: Sep. 21, 2018

(65) Prior Publication Data

US 2020/0095488 A1 Mar. 26, 2020

(51) Int. Cl.
*C09D 175/08* (2006.01)
*B64C 27/473* (2006.01)
(Continued)

(52) U.S. Cl.
CPC .......... *C09D 175/08* (2013.01); *B64C 27/473* (2013.01); *C08G 18/242* (2013.01); *C08G 18/3206* (2013.01); *C08G 18/4833* (2013.01); *C08G 18/6607* (2013.01); *C08G 18/73* (2013.01); *C09D 5/16* (2013.01); *C09D 5/1687* (2013.01); *C09D 175/04* (2013.01);
(Continued)

(58) Field of Classification Search
CPC ........ C09K 3/18; C09K 3/185; C09D 175/04; C09D 175/08; C08G 18/5015; C08G 18/5003; F01D 5/288
See application file for complete search history.

(56) References Cited

U.S. PATENT DOCUMENTS 5,332,798 A * 7/1994 Ferreri ................... C08G 18/10
528/61
6,001,923 A * 12/1999 Moncur ................. C08G 18/44
524/590
(Continued)

FOREIGN PATENT DOCUMENTS

CN 102746782 A * 10/2012
EP 3485987 A2 5/2019

OTHER PUBLICATIONS

Machine translation of CN 102746782 A, obtained from EspaceNet (Year: 2020).*

(Continued)

*Primary Examiner* — Z. Jim Yang
(74) *Attorney, Agent, or Firm* — Patterson + Sheridan, LLP

(57) ABSTRACT

Aspects of the present disclosure provide coatings and methods for depositing coatings onto surfaces. In one aspect, a method for forming a coating includes applying a composition to a surface of a component, the composition including a first polymer, a second polymer that is a fluoropolymer, an isocyanate, and a curative. The method includes curing the mixture at a first temperature of about 50° C. or greater and increasing the first temperature to a second temperature of about 80° C. or greater. The method includes obtaining a coating disposed on the surface of the component, the coating having a thickness of from about 10 mils to about 50 mils and a void density of less than 5 voids of size 0.5 mm or greater per $cm^2$.

36 Claims, 7 Drawing Sheets

(51) Int. Cl.

| | |
|---|---|
| *C08G 18/24* | (2006.01) |
| *C08G 18/32* | (2006.01) |
| *C08G 18/48* | (2006.01) |
| *C08G 18/66* | (2006.01) |
| *C08G 18/73* | (2006.01) |
| *C09D 175/04* | (2006.01) |
| *C09K 3/18* | (2006.01) |
| *F01D 25/02* | (2006.01) |
| *C09D 5/16* | (2006.01) |

(52) U.S. Cl.
CPC ............... *C09K 3/18* (2013.01); *F01D 25/02* (2013.01); *B64C 2027/4733* (2013.01); *F05D 2230/90* (2013.01); *F05D 2300/43* (2013.01); *F05D 2300/611* (2013.01)

(56) References Cited

U.S. PATENT DOCUMENTS

| | | | | |
|---|---|---|---|---|
| 6,313,335 | B1* | 11/2001 | Roberts | C08G 18/0823 428/391 |
| 2002/0147295 | A1* | 10/2002 | Turri | C08G 18/10 528/79 |
| 2003/0026997 | A1* | 2/2003 | Qiu | C04B 41/4884 428/423.1 |
| 2003/0113547 | A1* | 6/2003 | Brady, Jr. | C08G 18/10 428/423.1 |
| 2003/0229176 | A1* | 12/2003 | Trombetta | C08G 18/12 524/589 |
| 2004/0019145 | A1* | 1/2004 | Imoto | C08G 18/706 524/502 |
| 2006/0189750 | A1* | 8/2006 | Maier | C08G 18/2885 524/589 |
| 2006/0281861 | A1* | 12/2006 | Putnam | C09D 183/04 525/104 |
| 2008/0306238 | A1* | 12/2008 | Jariwala | C09D 5/1662 528/271 |
| 2009/0306284 | A1* | 12/2009 | Reiners | C08F 8/10 524/590 |
| 2011/0189395 | A1* | 8/2011 | Padigala | D21H 19/24 427/256 |
| 2012/0045954 | A1* | 2/2012 | Bleecher | C03C 17/30 442/80 |
| 2012/0156052 | A1* | 6/2012 | Richards | C09D 5/1668 416/241 R |
| 2014/0113144 | A1* | 4/2014 | Loth | C09D 7/61 428/421 |
| 2014/0127516 | A1* | 5/2014 | Wang | C08G 18/06 428/422 |
| 2014/0162022 | A1* | 6/2014 | Nowak | C09D 175/04 428/145 |
| 2014/0302267 | A1* | 10/2014 | Wynne | C08G 18/6674 428/36.91 |
| 2015/0044420 | A1* | 2/2015 | Nowak | B05D 5/08 428/141 |
| 2015/0079403 | A1* | 3/2015 | Zheng | C08G 18/73 428/421 |
| 2015/0152270 | A1* | 6/2015 | Aizenberg | A61L 31/04 210/500.27 |
| 2015/0166831 | A1* | 6/2015 | Kuehneweg | C08G 18/10 428/423.1 |
| 2015/0175814 | A1* | 6/2015 | Aizenberg | C03C 17/001 428/312.8 |
| 2015/0251217 | A1* | 9/2015 | Wohl, Jr | B05D 5/08 428/142 |
| 2015/0284614 | A1* | 10/2015 | Gross | C09D 5/00 428/220 |
| 2015/0361280 | A1* | 12/2015 | Reynolds | C09D 183/04 424/405 |
| 2016/0009971 | A1* | 1/2016 | Wang | C08G 18/44 428/314.4 |
| 2016/0059967 | A1* | 3/2016 | Tjeenk Willink | F01D 5/288 427/230 |
| 2016/0194574 | A1* | 7/2016 | Gross | C08G 18/10 508/138 |
| 2016/0201005 | A1* | 7/2016 | Nowak | C10M 169/041 508/552 |
| 2017/0002230 | A1* | 1/2017 | Nowak | C08G 18/6225 |
| 2017/0015922 | A1* | 1/2017 | Gross | C08G 81/00 |
| 2017/0037203 | A1* | 2/2017 | Sun | C08F 299/06 |
| 2017/0043860 | A1* | 2/2017 | Kumar | B32B 3/12 |
| 2017/0107413 | A1* | 4/2017 | Wang | C09D 183/00 |
| 2017/0158908 | A1* | 6/2017 | Doss | C08G 18/5015 |
| 2017/0166777 | A1* | 6/2017 | Berry | C08G 18/61 |
| 2017/0174910 | A1* | 6/2017 | Nowak | C08G 18/242 |
| 2017/0174911 | A1* | 6/2017 | Nowak | C08G 18/758 |
| 2017/0267871 | A1* | 9/2017 | Nowak | C09D 5/1681 |
| 2017/0298286 | A1* | 10/2017 | Nowak | C10M 103/04 |
| 2017/0321077 | A1* | 11/2017 | Ranganathan | C09D 127/18 |
| 2018/0009997 | A1* | 1/2018 | Bhagwagar | C09D 5/1675 |
| 2018/0016383 | A1* | 1/2018 | Gross | C09D 7/70 |
| 2018/0022851 | A1* | 1/2018 | Takao | C08G 18/5015 522/39 |
| 2018/0127616 | A1* | 5/2018 | Tuteja | C08G 18/61 |
| 2018/0142122 | A1* | 5/2018 | Weber | C08G 18/87 |
| 2018/0187008 | A1* | 7/2018 | Kurtoglu | C08L 75/08 |
| 2018/0208795 | A1* | 7/2018 | Dustin | C08G 18/5015 |
| 2019/0048223 | A1* | 2/2019 | Dustin | C08G 18/4854 |
| 2019/0118221 | A1* | 4/2019 | Nowak | B32B 27/304 |
| 2019/0382590 | A1* | 12/2019 | Meuler | C08G 18/3206 |

OTHER PUBLICATIONS

Chen, J., et al., Superhydrophobic surfaces cannot reduce ice adhesion. Applied Physics Letters, 2012. 101(11): p. 111603. [Abstract Only].

Varanasi, K.K., et al., Frost formation and ice adhesion on superhydrophobic surfaces. Applied Physics Letters, 2010. 97(23): p. 234102.

Cao, L., et al., Anti-Icing Superhydrophobic Coatings. Langmuir, 2009. 25(21): p. 12444-12448. [Abstract Only].

Kim, P., et al., Liquid-Infused Nanostructured Surfaces with Extreme Anti-Ice and Anti-Frost Performance. ACS Nano, 2012. 6(8): p. 6569-6577.

Wilson, P.W., et al., Inhibition of ice nucleation by slippery liquid-infused porous surfaces (SLIPS). Physical Chemistry Chemical Physics, 2013. 15(2): p. 581-585.

European Patent Office Extended European Search Report for Application 19198161.2-1102 dated Feb. 17, 2020.

China National Intellectual Property Administration, First Notification of Office Action for Application 201910892039.1 dated Sep. 27, 2021.

China National Intellectual Property Administration, Search Report for Application 201910892039.1 dated Sep. 17, 2021.

* cited by examiner

COMPOSITIONS AND METHODS FOR FABRICATING COATINGS

FIELD

Aspects of the present disclosure provide coatings and methods for depositing coatings onto surfaces.

BACKGROUND

Accumulation of frost, ice, or snow on aircraft changes airflow over aircraft wings, reducing lift and increasing drag. The accumulations also add to the total weight, increasing lift required for takeoff. Accordingly, frost, ice, or snow is normally removed prior to take-off. While in flight, hot engine bleed air, electric blankets, mechanical boots, or combinations thereof may be used to keep ice off exterior surfaces of aircraft. These measures, however, consume energy, add weight to the aircraft, and reduce fuel economy.

On the ground, anti-icing and de-icing fluids in the form of hot glycol sprays are used. While effective, such fluids generate an added expense and may cause gate delays from additional application time. As a result, new options for removing ice from aircraft are desirable.

Fluoropolymers can be coated onto a surface to reduce or prevent ice accumulation. However, conventional methods, such as conventional spray coating methods, for forming coatings, such as fluoropolymer coatings, provide coatings having voids which can limit the mechanical properties and/or smoothness of the outer surface of the coating which can limit resistance to sand and rain at high speed (e.g., 400 mph-500 mph). Furthermore, conventional methods for fluoropolymer deposition provide fluoropolymer coatings having a maximum thickness of about 10 mils, e.g. over a curved surface of the aircraft part because of creep/flow of the deposited coating. In addition, if a fluoropolymer is mixed with a substantial amount of another component, conventional methods for fluoropolymer deposition promote "waxing out" of the fluoropolymer from the deposited layer.

There is a need for methods for forming smooth void-free icephobic coatings.

SUMMARY

Aspects of the present disclosure provide coatings and methods for depositing coatings onto surfaces.

In one aspect, a coating includes the reaction product of a first polymer, a second polymer that is a fluoropolymer, an isocyanate, and a curative (e.g., polyol or polyamine curative) having a molecular weight less than the molecular weight of the first polymer. The coating has a thickness of from about 10 mils to about 50 mils and a void density of less than 5 voids of size 0.5 mm or greater per $cm^2$.

Aspects of the present disclosure further provide a method for forming a coating, the method including applying a composition to a surface of a component, the composition including a first polymer, a second polymer that is a fluoropolymer, an isocyanate, and a curative (e.g., polyol or polyamine curative) having a molecular weight less than the molecular weight of the first polymer. The method includes curing the mixture at a first temperature of about 50° C. or greater and increasing the first temperature to a second temperature of about 80° C. or greater. The method includes obtaining a coating disposed on the surface of the component, the coating having a thickness of from about 10 mils to about 50 mils and a void density of less than 5 voids of size 0.5 mm or greater per $cm^2$.

Aspects of the present disclosure further provide an airfoil including: a root section having a first surface; an intermediate section having a first surface and coupled with the root section at a first end; a tip section having a first surface and coupled at a first end with a second end of the intermediate section; and a coating adjacent at least one of the first surface of the root section, the first surface of the intermediate section, and the first surface of the tip section. The coating includes the reaction product of a first polymer, a second polymer that is a fluoropolymer, an isocyanate, and a curative (e.g., a polyol or polyamine having a molecular weight less than the molecular weight of the first polymer). The coating has a thickness of from about 10 mils to about 50 mils and a void density of less than 5 voids of size 0.5 mm or greater per $cm^2$.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Aspects of the present disclosure provide coatings and methods for depositing coatings onto surfaces. Methods can include applying a composition to a surface of a component, the composition including a first polymer, a second polymer that is a fluoropolymer, an isocyanate, and a curative (e.g., a polyol or a polyamine having a molecular weight less than the molecular weight of the first polymer). Methods can include curing the mixture at a first temperature of about 50° C. or greater and increasing the first temperature to a second temperature of about 80° C. or greater. The second temperature can be increased to a third temperature of about 100° C. or greater. Methods of the present disclosure can provide coatings having a thickness of from about 10 mils to about 50 mils and a void density of less than 5 voids of size 0.5 mm or greater per cm$^2$, providing smooth icephobic coatings on surfaces, such as vehicle surfaces, with improved rain and sand erosion resistance.

Surface Preparation of a Component

Figure 1:
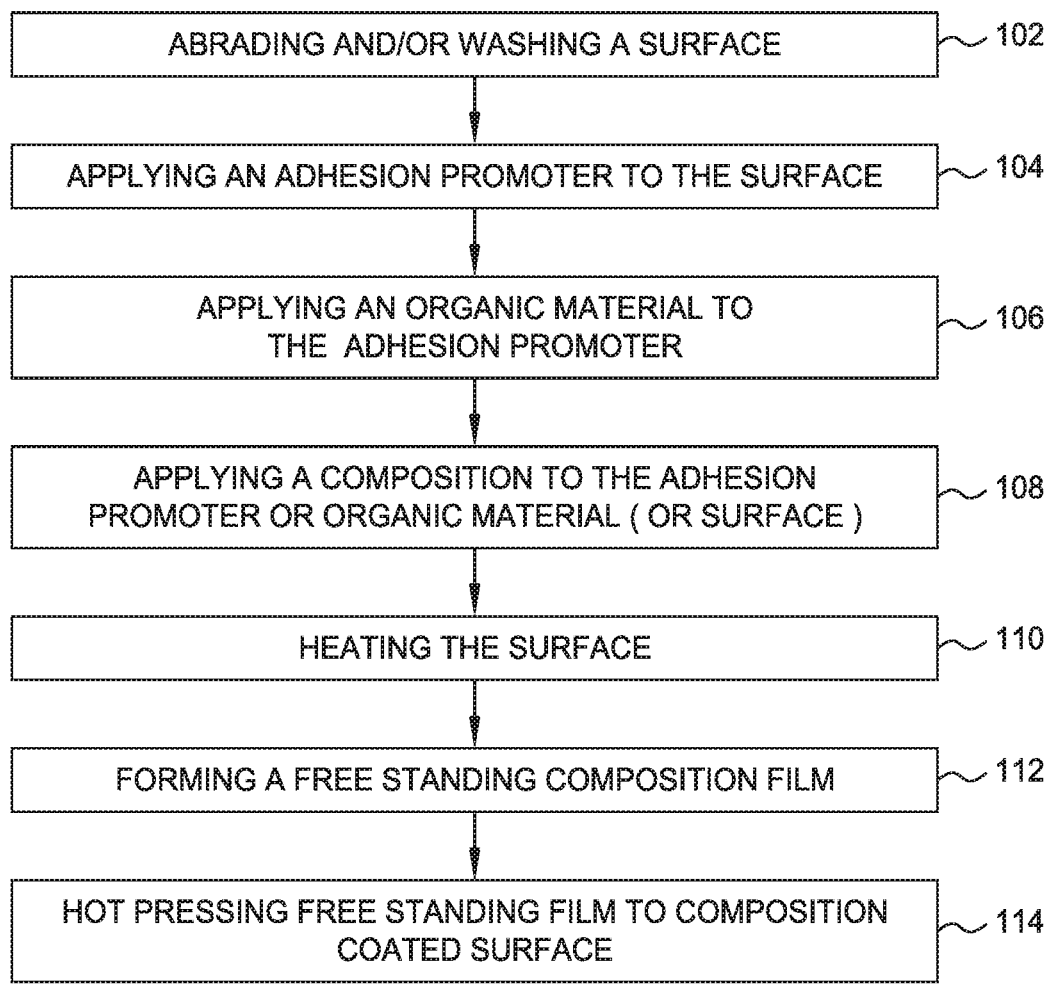
FIG. 1 is a flow diagram of a method for manufacturing surfaces having smooth icephobic coatings disposed thereon, according to one aspect.

FIG. 1 is a method 100 for manufacturing surfaces having smooth icephobic coatings disposed thereon. In at least one aspect, as shown in FIG. 1, a surface, such as a surface of a component, can be abraded and/or washed with a solvent (block 102). A component can be a part of a wind turbine, satellite, or a vehicle such as a car, a train, a boat, and the like. A vehicle component is a component of a vehicle, such as a structural component, such as an engine inlet lip, an airfoil, a wing, landing gear(s), a panel, or joint, of an aircraft. Examples of a vehicle component include an engine inlet lip, an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component. In at least one aspect, a surface is abraded with an abrasion pad to provide an exposed surface. For example, an aluminum surface is abraded to remove oxidized aluminum and expose an elemental aluminum surface. In at least one aspect, an abrasion pad has an about 100 grit surface to about 1,000 grit, such as about 400 grit to about 500 grit. Suitable abrasion pads include Scotch-Brite™ abrasion pads available from 3M Corporation. An abraded surface can be washed with soap and water with scrubbing to remove any loose surface material or debris. After washing, the surface (such as a surface of a vehicle component) can be introduced into an alkaline solution containing a detergent. Additionally or alternatively, an alkaline solution containing a detergent can be sprayed on the surface. The alkaline solution can be aqueous sodium hydroxide, sodium bicarbonate, potassium carbonate, or sodium carbonate. A detergent can be Micro-90® detergent (which includes surfactants and chelators) available from International Products Corporation of Burlington, N.J. The pH of the alkaline solution containing a detergent can be from about 7 to about 12, such as about 9. The surface (such as a surface of a vehicle component) present in the alkaline solution having a detergent can be sonicated for about 1 minute to about 1 hour, such as about 20 minutes. The alkaline solution having a detergent provides additional removal of oxidation on the surface. The surface (such as a surface of a vehicle component) can then be removed from the solution, washed with water, and introduced into an acetone bath. The surface present in the acetone bath can be sonicated for about 1 minute to about 1 hour, such as about 20 minutes. The surface is removed from the acetone bath and dried. The surface can be stored under an inert atmosphere, such as nitrogen or argon, until further use.

A coating of the present disclosure can be applied to the abraded surface directly (for example, in the manner described below) or the abraded surface can undergo further surface preparation, for example, as described below.

Surface Preparation for Spray Application

In at least one aspect, as shown in FIG. 1, a metal adhesion promoter is applied to the surface (block 104) to enhance the bond of an organic material to the surface. The method includes applying an adhesion promoter that is the reaction product of acetic acid, zirconium tetra-n-propoxide, and (3-glycidyloxypropyl)trimethoxysilane. An adhesion promoter can be Boegel®, such as 3M Surface Pre-Treatment AC-131 CB. 3% AC-131 kit can be obtained from 3M Corporation. The adhesion promoter can be a layer on the surface. 3% AC-131 is a non-chromate conversion coating and is typically disposed on aluminum, nickel, stainless steel, magnesium, and titanium alloys. AC-131 has a Part A, which is an aqueous mixture of glacial acetic acid (GAA) and zirconium tetra-n-propoxide (TPOZ) and a Part B, which is (3-glycidyloxypropyl)trimethoxysilane (GTMS). The two components are mixed together (Part A+Part B) and the molar ratio of silicon to zirconium in the mixture is 2.77:1. A molar ratio of acetic acid to TPOZ in Part A is 0.45:1. The measured volumes of GAA and TPOZ can be mixed vigorously for about 10 minutes and then added to the Part A from the AC-131 kit. The premixed Part A solution can then be added to a measured volume of the Part B solution from the AC-131 kit and stirred followed by a 30 minute induction period. This solution is then disposed on the surface (such as a surface of a vehicle component) by spraying, immersing, brushing, and/or wiping. For example, suitable forms of spraying include spraying with a spray gun, high-volume, low-pressure spray gun, and/or hand pump sprayer. The solution is then cured (at room temperature or elevated temperature) to form a sol-gel. In at least one aspect, a curing temperature is from about 10° C. to about 150° C., such as from about 20° C. to about 100° C., such as from about 30° C. to about 70° C., such as from about 40° C. to about 50° C. Curing can be performed for a time period of from about 15 minutes to about 72 hours. An adhesion promoter layer can have a thickness of from about 0.5 mil to about 5 mil, such as from about 1 mil to about 2 mil.

As shown in FIG. 1, an organic material is deposited onto the adhesion promoter (block 106). The organic material can be a layer on the adhesion promoter. Organic material can include a primer such as an epoxy, a polyurethane, a primer material such as an epoxy or urethane primer, or a fiber-reinforced plastic. Depositing can include painting, spraying, immersing, contacting, adhering, and/or bonding sol-gel with the organic material to form an organic material layer. An organic material layer can have a thickness of from about 0.5 mil to about 5 mil, such as from about 1 mil to about 2 mil.

Depositing a Coating

As shown in FIG. 1, a coating is deposited or disposed onto the adhesion promoter layer or the organic material layer or surface (e.g., metal surface) (block 108).

A coating of the present disclosure can be formed by applying a composition to a surface of a component (e.g., the organic material layer disposed on a vehicle component). As used herein, the term "composition" can include the components of the composition and/or the reaction product(s) of two or more components of the composition. As used herein, the term "mixture" can include the components of the mixture and/or the reaction product(s) of two or more components of the mixture.

Compositions of the present disclosure can include a first polymer, a second polymer that is a fluoropolymer, an isocyanate, optional filler, and a curative (a polyol or a polyamine) having a molecular weight less than the molecular weight of the first polymer.

For example, a composition can be formed by mixing a first polymer and an isocyanate and heating the mixture (e.g., at a temperature of from about 80° C. to about 120° C., such as about 100° C.) with stirring. A molar ratio of first polymer to isocyanate can be from about 1:1 to about 1:20, such as about 1:10. To the mixture, a tin catalyst can be added and stirred at the elevated temperature for from about 1 minutes to about 3 hours, such as about 1 hour. A tin catalyst can be any suitable catalyst configured to promote bonding of the first polymer with an isocyanate, such as any known organo tin catalyst for polyurethane synthesis. In at least one aspect, a tin catalyst is dibutyltin dilaurate.

An isocyanate can be one or more of 4,4'-methylenebis (cyclohexyl isocyanate), hexamethylene diisocyanate, cycloalkyl-based diisocyanates, tolylene-2,4-diisocyanate, 4,4'-methylenebis(phenyl isocyanate), or isophorone diisocyanate. In at least one aspect, a first polymer is a polyester, a polyether, a siloxane, or a combination thereof. For example, a siloxane can be polydimethylsiloxane. In one example, a first polymer is selected from poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), or combinations thereof. Alternatively, a first polymer can be selected from one or more of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, poly(ethylene glycol) diacryalate, or poly(ethylene glycol) polyacrylates (e.g., triacrylates or greater).

To the mixture containing tin catalyst, a second polymer that is a fluoropolymer is added. A molar ratio of first polymer to second polymer can be from about 0.1:1 to about 1:0.1, such as about 1:1. The mixture containing the second polymer can be heated (e.g., at a temperature of from about 80° C. to about 120° C., such as about 100° C.) with stirring for from about 1 minute to about 3 hours, such as about 1 hour. A fluoropolymer can include a polyfluoroether, a perfluoropolyether, a polyfluoroacrylate, a polyfluorosiloxane, a polytetrafluoroethylene, a polyvinylidene difluoride, a polyvinylfluoride, a polychlorotrifluoroethylene, a copolymer of ethylene and trifluoroethylene, a copolymer of ethylene and chlorotrifluoroethylene, or combinations thereof. In at least one embodiment, a fluoropolymer has a number average molecular weight of from about 500 g/mol to about 10,000 g/mol, such as from about 2,000 g/mol to about 5,000 g/mol. Fluoropolymers having a number average molecular weight of from about 500 g/mol to about 10,000 g/mol can provide sufficiently polar and large enough polymers to form a multiphasic composition in the presence of first polymer.

In at least one embodiment, a fluoropolymer is represented by Formula (I):

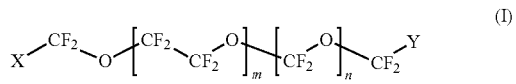

(I)

wherein:
X and Y are independently —CH$_2$—(O—CH$_2$—CH$_2$)$_p$— OH or —CH$_2$—(O—CH$_2$—CH$_2$)$_p$—NH$_2$ wherein p is an integer from 0 to 50;
m=1 to 100; and
n=1 to 100.

The mixture containing the fluoropolymer, first polymer, and isocyanate can then be allowed to cool, e.g. to about 30° C. to about 40° C. A solvent and a curative are added to the fluoropolymer mixture after or during the cooling such that the mixture, after addition of solvent and curative (e.g., polyol, polyamine, or a mixture thereof), includes from about 1 wt % to about 25 wt % solvent, such as from about 10 wt % to about 20 wt %, based on the total weight of the mixture. A molar ratio of curative to second polymer can be from about 1:1 to about 20:1, such as about 8:1.

The solvent and curative can be added to the mixture (fluoropolymer, first polymer, and isocyanate) sequentially or as a mixture of solvent and curative. The mixture containing fluoropolymer, first polymer, isocyanate, solvent, and curative can be stirred for from about 10 seconds to about 1 hour, such as from about 20 seconds to about 1 minute. The mixture containing first polymer, fluoropolymer, isocyanate, solvent, and curative is applied to a surface of a component (e.g., the organic material layer disposed on a vehicle component). Because of the low amounts of solvent used, the mixture containing first polymer, fluoropolymer, isocyanate, solvent, and curative can have a viscosity from about 0.00046 Pa*s to about 1 Pa*s at 25° C., such as from about 0.001 Pa*s to about 0.8 Pa*s at 25° C. as determined by ASTM D445-17a. A mixture containing first polymer, fluoropolymer, isocyanate, solvent, and curative can provide a viscosity sufficiently high, such as 0.00046 Pa*s or greater, to coat non-flat surfaces, such as non-flat metal surfaces, conformally (e.g., conformal deposition onto a curved surface of a vehicle component). The conformal coating can have a substantially uniform thickness across the surface. After a stage-wise curing of the present disclosure, the conformal coating can also have a low void content because of one or more of the low solvent content, high boiling point of the solvent, and stage-wise curing.

A solvent can be a hydrocarbon solvent, an ester solvent, or a fluorinated solvent. A solvent has a boiling point of from about 50° C. to about 200° C., such as from about 100° C. to about 160° C. Ester solvents can include ethyl acetate, n-butyl acetate, or a mixture thereof. Hydrocarbon solvents can include toluene or xylenes. Fluorinated solvents can include 4-chlorobenzotrifluoride, 1,3-bis(trifluoromethyl) benzene, or a mixture thereof. Solvents of the present disclosure can provide dissolution of the components of the mixture in addition to having a boiling point that (in combination with the stage-wise curing described below) provides coatings having little or no voids.

A curative (e.g., a polyol or a polyamine) of the present disclosure can have a molecular weight less than the molecular weight of the first polymer. A polyol can have a molecular weight of 1,000 g/mol or less. A polyol can be selected from 1,4-butanediol, 1,3-propanediol, 1,2-ethanediol, glycerol, trimethylolpropane, or a mixture thereof. A polyamine can have a molecular weight of 1,000 g/mol or less. A polyamine can be selected from ethylenediamine, isophoronediamine, or diaminocyclohexane. Without being bound by theory, it is believed that a curative (e.g., a polyol or a polyamine) of the present disclosure can provide crosslinking of first polymer phases with second polymer phases to provide added strength to a multiphasic system.

In addition, a composition of the present disclosure can optionally further include one or more particulate fillers, a pigment, a dye, a plasticizer, a flame retardant, a flattening agent, and a substrate adhesion promoter. A particulate filler may be selected from silica, alumina, silicates, talc, aluminosilicates, barium sulfate, mica, diatomite, calcium carbonate, calcium sulfate, carbon, wollastonite, or combinations thereof. For example, a filler can be introduced to the composition before or while the first polymer and the isocyanate are being mixed.

The mixture containing first polymer, second polymer, isocyanate, solvent, and curative (and optional filler) can be applied to a surface of a component (e.g., the organic material layer) and cured. The mixture can be applied to a surface of a component by spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing.

For example, a mixture containing first polymer, second polymer, isocyanate, solvent, and curative can be poured onto the adhesion promoter layer or the organic material layer and drawn out across a surface of the adhesion promoter layer or the organic material layer with a doctor blade, draw down bar, direct or reverse gravure, offset gravure, Precision Slot Die, or Meyer rod to form a layer. The mixture can be drawn out at line speed of from 1 fpm to about 95 fpm at a coating web width of from about 4" wide to about 24" wide. The mixture can be drawn out in an inert atmosphere, e.g. nitrogen or argon. The layer can have a thickness of about 10 mils or greater. The drawn out mixture (layer) can be cured in a stage-wise process, as described in more detail below. In at least one aspect, the mixture is poured onto the adhesion promoter layer or the organic material layer through a gap, such as a slot die.

Alternatively, a mixture containing first polymer, second polymer, isocyanate, solvent, and curative can be sprayed onto the adhesion promoter layer or the organic material layer using any suitable spray apparatus, such as an airbrush. In at least one aspect, during spraying, a nozzle of the spray apparatus is separated from the surface of the adhesion promoter layer or the organic material layer at a distance of from about 0.5 inch to about 30 inches, such as from about 2 inches to about 10 inches, such as from about 4 inches to about 8 inches, which is a distance sufficiently close to the surface to provide spraying at a controlled location of the surface. In at least one aspect, the mixture containing first polymer, second polymer, isocyanate, solvent, and curative is sprayed onto the adhesion promoter layer or the organic material layer at a pressure of from about 7 psi to about 24 psi, such as from about 12 psi to about 18 psi. Other sprayer/pressure options can include: HVLP/LVLP from about 10 psi to about 60 psi; Air brushes from about 20 psi to about 50 psi; Hydraulic sprayers from about 500 psi to about 2000 psi; Robotic sprayers from about 100 to about 1000 psi.

The nozzle of the spray apparatus is moved parallel to the surface of the adhesion promoter layer or the organic material layer. Two full movements of the nozzle parallel to the surface ("there and back") of the adhesion promoter layer or the organic material layer is referred to as one "pass". One pass can deposit the mixture onto the surface at a thickness of from about 0.5 mil to about 2 mil, such as from about 0.8 mil to about 1.2 mil, such as about 1 mil. A time period from one pass to a subsequent pass can be from about 0.1 minute to about 30 minutes, such as from about 0.5 minute to about 5 minutes, such as from about 1 minute to about 2 minutes. Providing time in between passes promotes solvent removal from layers deposited by individual passes. Furthermore, stage-wise curing of the present disclosure, after one or more of the passes, can promote removal of solvent from the layer of the pass to further reduce void content of compositions of the present disclosure.

After several passes, a mixture (as a layer) is formed having a thickness of from about 10 mil to about 50 mil, such as from about 15 mil to about 45 mil, such as from about 20 mil to about 40 mil. It has been discovered that curing the mixture (layer) in a stage-wise process provides reduced void content of a cured composition (layer) of the present disclosure, which can provide smooth icephobic coatings on the surfaces of components, such as vehicle components. Curing further promotes removal of solvent from a composition (as a layer). Stage-wise curing further provides reduced "waxing out" of the fluoropolymer from the deposited layer.

For example, a mixture (layer) of the present disclosure can be cured at a first temperature, such as a first temperature of about 50° C. or greater, such as from about 50° C. to about 150° C., such as from 50° C. to about 100° C., such as from about 50° C. to about 80° C. Curing the mixture at the first temperature can be performed for from about 5 minutes to about 2 hours (a "dwell time").

After a dwell time, the first temperature can be increased to a second temperature, such as a second temperature of about 80° C. or greater, such as from about 80° C. to about 150° C., such as from about 80° C. to about 130° C., such as from about 80° C. to about 100° C. Increasing the first temperature to the second temperature can be performed at a ramp rate of about 0.1° C./min to about 10° C./min, such as from about 0.5° C./min to about 5° C./min, such as from about 0.5° C./min to about 2° C./min. Curing the mixture at the second temperature can be performed for from about 5 minutes to about 10 hours, such as from about 5 minutes to about 2 hours (dwell time).

After a dwell time, the second temperature can be increased to a third temperature, such as a third temperature of about 100° C. or greater, such as from about 100° C. to about 200° C., such as from about 100° C. to about 150° C., such as from about 100° C. to about 120° C. Increasing the second temperature to the third temperature can be performed at a ramp rate of about 0.1° C./min to about 10° C./min, such as from about 0.5° C./min to about 5° C./min, such as from about 0.5° C./min to about 2° C./min. Curing the mixture at the third temperature can be performed for from about 5 minutes to about 10 hours, such as from about 5 minutes to about 2 hours (dwell time).

After a dwell time, the third temperature can be increased to a fourth temperature, such as a fourth temperature of about 120° C. or greater, such as from about 120° C. to about 250° C., such as from about 120° C. to about 200° C., such as from about 120° C. to about 150° C. Increasing the third temperature to the fourth temperature can be performed at a ramp rate of about 0.1° C./min to about 10° C./min, such as from about 0.5° C./min to about 5° C./min, such as from about 0.5° C./min to about 2° C./min. Curing the mixture at the fourth temperature can be performed for from about 5 minutes to about 10 hours, such as from about 5 minutes to about 2 hours (dwell time).

After a dwell time, the fourth temperature can be increased to a fifth temperature, such as a fifth temperature of about 150° C. or greater, such as from about 150° C. to about 250° C., such as from about 150° C. to about 220° C., such as from about 150° C. to about 200° C. Increasing the fourth temperature to the fifth temperature can be performed at a ramp rate of about 0.1° C./min to about 10° C./min, such as from about 0.5° C./min to about 5° C./min, such as from about 0.5° C./min to about 2° C./min. Curing the mixture at the fifth temperature can be performed for from about 5 minutes to about 10 hours, such as from about 5 minutes to about 2 hours (dwell time).

The temperature of the mixture during a curing stage can be determined by any suitable thermocouple contacting the surface, such as a Type K or Type J thermocouple. Heating a mixture can be performed using light exposure (e.g., ultraviolet light) of a surface. The light can be infrared (IR) or ultraviolet (UV). Exposing a mixture to light (and heating) can be performed using a FUSION UV curing unit fitted with a H+ bulb with a maximum emittance at 365 nm. In at least one aspect, the bulb of the UV/IR curing unit is oriented about 45° relative to the flow direction of material flowing from the nozzle of the spray apparatus. In at least one aspect, the bulb of the UV/IR curing unit is separated from the surface at a distance of from about 8 inches to about 3 feet, such as about 11 inches to about 1.5 feet. An IR curing unit, for example, provides a smooth surface texture of the coating which might otherwise have a more rippled effect, providing improved durability of the surface against rain and sand erosion.

Furthermore, in examples where the first polymer and the second polymer (fluoropolymer) substantially differ in polarity, a composition of the present disclosure may be multiphasic such that the first polymer is a first phase and the second polymer is a second phase within the first phase. Alternatively, the first phase can be within the second phase simply by increasing the molar ratio of second polymer to first polymer during the preparation of the composition, as described above, e.g. a molar excess of second polymer to first polymer. A fluoropolymer can provide a non-stick surface (for water/ice) while a first polymer, such as polyethylene glycol, can provide freezing point suppression for ice.

For example, a first polymer of the present disclosure can have a polarity that is sufficiently different than the second polymer (fluoropolymer) such that a composition is multiphasic (e.g., biphasic) having a major phase (continuous phase) of first polymer (or second polymer) and a minor phase (having islands ("inclusions")) of second polymer (or first polymer). An average distance between inclusions can be from about 0.5 microns to about 100 microns, such as from about 1 micron to about 50 microns. Multiphase compositions of the present disclosure can provide improved ice-adhesion properties.

In at least one aspect, a composition of the present disclosure has an average void density of less than 5 voids of size 0.5 mm or greater per cm$^2$, such as less than 1 void of size 0.5 mm or greater per cm$^2$, as determined by optical microscopy, which can provide a smooth, conformal surface of the composition. In at least one aspect, a composition of the present disclosure has a surface roughness of less than about 100 microinches, such as less than about 90 microinches, such as less than about 80 microinches, such as less than about 70 microinches, such as from about 5 microinches to about 100 microinches, such as from about 20 microinches to about 80 microinches, as determined by ASTM D7127-05 (Standard Test Method for Measurement of Surface Roughness of Abrasive Blast Cleaned Metal Surfaces Using a Portable Stylus Instrument).

The smooth compositions (layers) of the present disclosure can provide stable laminar flow of water over the composition for reduced rain erosion as compared to conventional fluoropolymer layers. For example, a composition of the present disclosure can have a coating rain erosion rate of 0.5 mil/50 mins or less at 400 mph, such as 0.2 mil/50 mins or less, as determined using the University of Dayton Research Institute method described herein. A composition of the present disclosure can have a sand loading erosion of 50 g/cm$^2$ or greater at a 20 mil thickness at 500 mph at an impact angle of 20 degrees, such as 75 g/cm$^2$ or greater, such as 85 g/cm$^2$ or greater, as determined using the University of Dayton Research Institute method described herein.

The compositions (layers) of the present disclosure can provide mechanical properties. For example, a composition of the present disclosure can have an elongation of from about 300% to about 1,000%, such as from about 400% to about 500%, as determined by ASTM D412. A composition of the present disclosure can have a tensile strength of from about 30 MPa to about 90 MPa, such as from about 70 MPa to about 90 MPa, as determined by ASTM D412.

Because compositions of the present disclosure can be icephobic, a composition can have an ice adhesion reduction factor of about 10 or more, such as about 25 or more, such as about 40 or more, such as about 75 or more, such as about 100 or more, as determined by the Anti-Icing Materials International Laboratory (AMIL) test. AMIL is the Anti-icing Materials International Laboratory located at the Université du Québec à Chicoutimi in Chicoutimi, Quebec, Canada. The icephobic character of a coating can be evaluated by measuring the ice adhesion reduction effect of a candidate coating compared to an uncoated surface. AMIL can evaluate icephobic coatings in many different atmospheric conditions (wind and temperature) with glaze or rime accreted ice obtained with a simulation of freezing precipitation.

A single "Centrifuge Adhesion Test" by AMIL consists of the ice adhesion measurement of 5 or 6 small aluminum beams covered with the candidate product, compared with 5 or 6 bare beams. The extremity of the sample beams are iced simultaneously with freezing precipitation on about 5 cm$^2$ surface to a thickness of about 7 mm. Each sample beam is rotated and balanced in the centrifuge apparatus. The rotation speed increases with a constant acceleration rate until the centrifugal force resulting from rotation reaches the adhesion stress of ice, detaching the ice. This detachment is picked up by a piezoelectric cell (sensitive to vibrations) which relays signals in real time to a computer. Finally, the adhesion stress is calculated using detachment speed, the mass of ice, and the beam length.

The Adhesion Reduction Factor, ARF is calculated using the average stress measured on the coated beams compared to the average stress measured on the three bare (control) beams. In particular, from the centrifugal force the stress is determined as $F=mr\ \omega2$ where F=centrifugal force [N], m=mass of ice [kg], r=radius of the beam [m], and ω=speed of rotation [rad/s]. The Adhesion Reduction Factor (AMIL ARF) is then calculated using the average stress measured on the three coated beams compared to the average stress measured on the three bare beams: ARF=τbare/τcoated where τbare=average stress measured on three simultaneously iced bare beams [Pa] and τcoated=average stress measured on three simultaneously iced beams with candidate icephobic coating [Pa]. The web site www.uqac.ca/amil/en/icephobiccoatings/centrifuge, as retrieved on the filing date hereof, is hereby incorporated by reference herein.

An ARF value of 1 means there is no icephobic effect. An ARF value greater than 1 means there is an ice-adhesion reduction (icephobic effect); the higher the value, the more icephobic (low ice adhesion) the coating.

Figure 2:
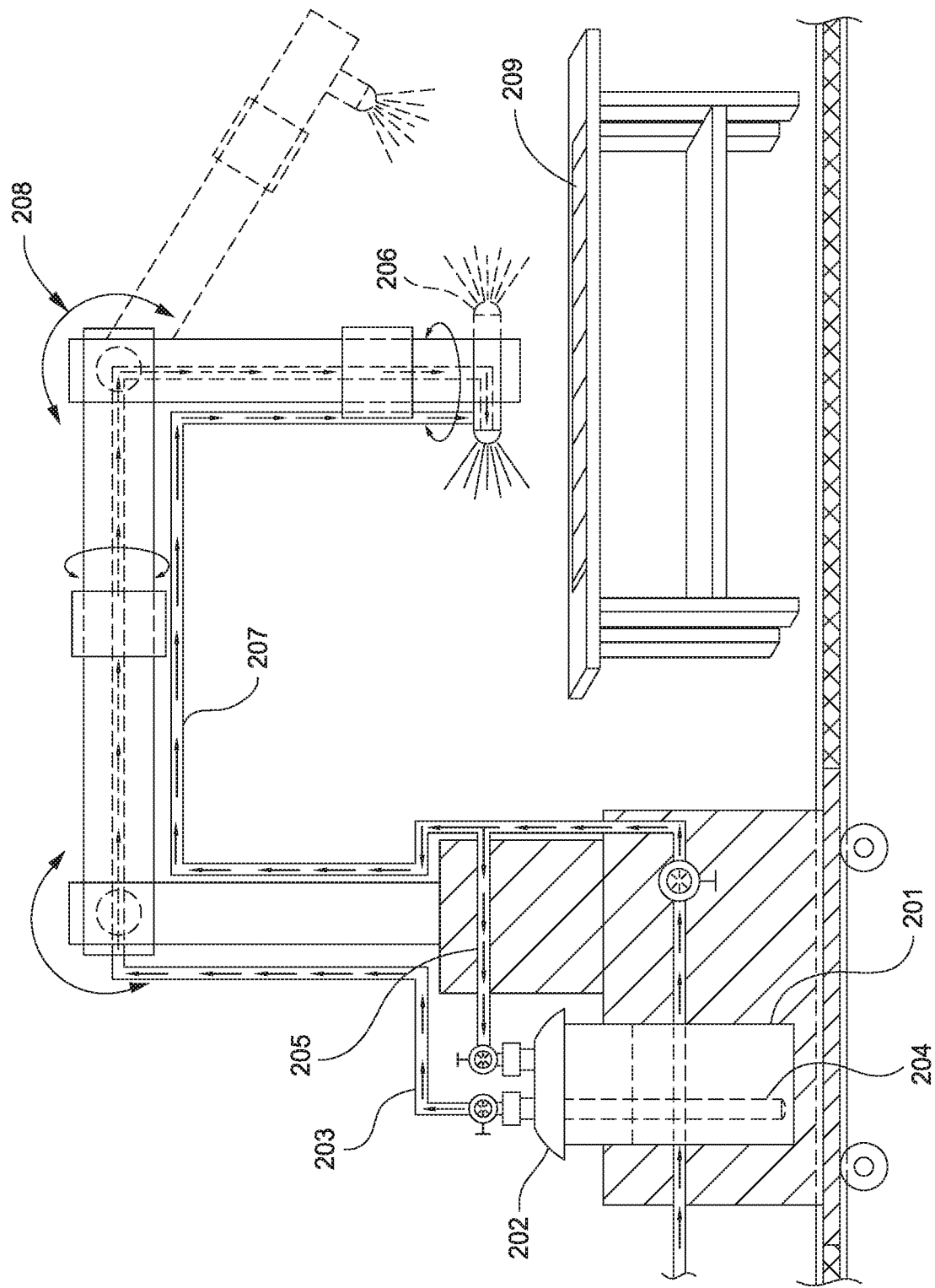
FIG. 2 is a robotic sprayer, according to one aspect.

In at least one aspect, the spray apparatus for depositing the composition, the second fluoropolymer, the adhesion promoter, and/or the organic material is a robotic sprayer. FIG. 2 is a robotic sprayer. As shown in FIG. 2, a material (such as a mixture of first polymer, second polymer, isocyanate, curative and solvent) is charged to a pressure pot 201 with a disposable polyethylene liner. The lid 202 is installed and clamped pressure tight. A fluid delivery hose 203 is connected to the pickup tube 204 inside the pressure pot.

Pressure regulated nitrogen or dry air is injected through line 205 to pressurize the pot and force material into the pickup tube and line. The pressure pot has pressure relief valves to prevent over pressurization and to bleed pressure from the pot for removing or adding the material. A regulator is located near the gun 206 to control the fluid pressure being delivered. Controlling the fluid pressure at the gun controls the volumetric flow rate through the gun's spray nozzle. Installing the regulator near the gun eliminates any pressure drop influence from hose length, hose diameter, or robot arm height. Nozzle control is also desired to control flow rates. Slight manufacturing variances in the nozzle orifice can result in different liquid flow rates. Nozzle control and fluid pressure regulation at the gun work in conjunction to give consistent and repeatable volumetric flow rates through the nozzle. The air assist atomization pressure through line 207 also is regulated and controlled to give consistent spray dispersion from the nozzle.

The robot 208 carries the gun and is programmed to traverse across the surface of the component with a constant offset from the surface 209 (which can be a non-flat surface) and a controlled velocity. The spray from the nozzle typically has a flat fan pattern. Most of the spray material is deposited at the center of the fan with tapering amounts delivered at the fan edges. To compensate for this nonuniform distribution in the spray fan, the robot is programmed to overlap adjacent passes to even out the distribution. Typical pass indexing is ¼ fan width.

In at least one aspect, as shown in FIG. 1, method 100 includes heating the surface (such as a surface of a vehicle component) before, during, and/or after depositing fluoropolymer onto the surface (block 110). For example, heating the surface while depositing the fluoropolymer composition onto the surface can provide in-situ solvent removal and increased viscosity of the mixture containing first polymer, second polymer, isocyanate, curative, and solvent, providing conformal deposition onto a curved (non-flat) surface of a vehicle component. Heating the surface while depositing the composition onto the surface can provide additional uniform composition layers to achieve an overall thicker coating (e.g., 20 mil to 60 mil) with reduced or eliminated voids caused by trapped solvent because some or all of the solvent has been removed. Heating the surface while depositing composition onto the surface further provides smoother layers as compared to room temperature cured layers. The conformal coating has a substantially uniform thickness across the surface. During heating, a surface (such as a surface of a vehicle component) can have a temperature of from about 30° C. to about 70° C., such as from about 45° C. to about 55° C., as determined by any suitable thermocouple contacting the surface, such as a Type K or Type J thermocouple. Heating a surface can be performed using light exposure (e.g., ultraviolet light) of a surface. The light can be infrared (IR) or ultraviolet (UV). Exposing a surface to light (and heating) can be performed using a FUSION UV curing unit fitted with a H+ bulb with a maximum emmittance at 365 nm. In at least one aspect, the bulb of the UV/IR curing unit is oriented about 45° relative to the flow direction of material flowing from the nozzle of the spray apparatus. In at least one aspect, the bulb of the UV/IR curing unit is separated from the surface at a distance of from about 8 inches to about 3 feet, such as about 11 inches to about 1.5 feet. An IR curing unit, for example, provides a smooth surface texture of the coating which would otherwise have a more rippled effect, providing improved durability of the surface against rain and sand erosion.

Figure 3:
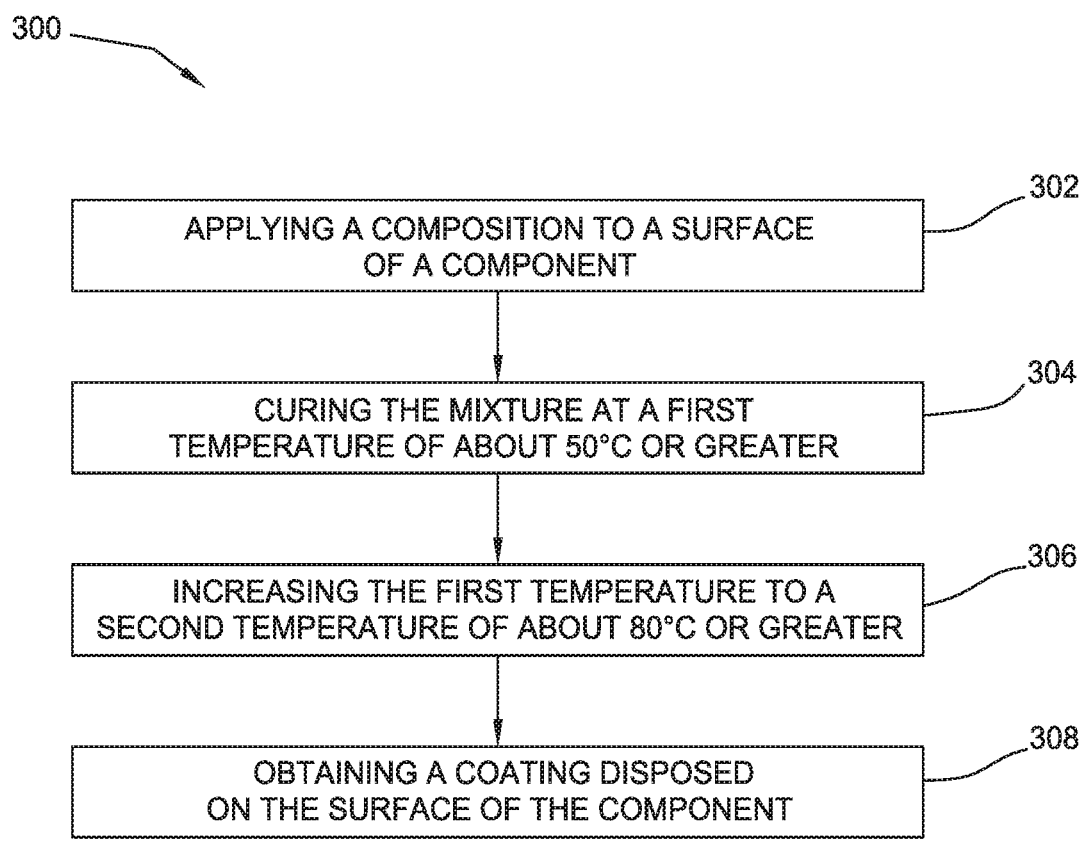
FIG. 3 is a flow diagram of a method for manufacturing surfaces having smooth icephobic coatings disposed thereon, according to one aspect.

FIG. 3 is a flow diagram of a method 300 for manufacturing surfaces having smooth icephobic coatings disposed thereon, according to one aspect. Method 300 includes applying 302 a composition to a surface of a component, the composition including a first polymer, a second polymer that is a fluoropolymer, an isocyanate, and a curative. Method 200 includes curing 304 the mixture at a first temperature of about 50° C. or greater and increasing 306 the first temperature to a second temperature of about 80° C. or greater. Method 300 includes obtaining 308 a coating disposed on the surface of the component, the coating having a thickness of from about 10 mils to about 50 mils and a void density of less than 5 voids of size 0.5 mm or greater per $cm^2$.

Forming a Free Standing Film

As shown in FIG. 1, method 100 includes forming a free standing composition film (block 112). A mixture of first polymer, second polymer, isocyante, curative and solvent, as described above, is sprayed or deposited (as described above) onto the a mylar sheet, such as silanized mylar.

For example, a mixture containing first polymer, second polymer, isocyanate, solvent, and curative can be poured onto the mylar sheet and drawn out across a surface of the mylar sheet with a doctor blade, draw down bar, direct or reverse gravure, offset gravure, Precision Slot Die, or Meyer rod to form a layer. The mixture can be drawn out at line speed of from 1 fpm to about 95 fpm at a coating web width of from about 4" wide to about 24" wide. The mixture can be drawn out in an inert atmosphere, e.g. nitrogen or argon. The layer can have a thickness of about 10 mils or greater. The drawn out mixture (layer) can be cured in a stage-wise process, as described above. In at least one aspect, the mixture is poured onto the mylar sheet through a gap, such as a slot die.

In at least one aspect, during spraying, a nozzle of the spray apparatus is separated from a surface of the mylar sheet at a distance of from about 0.5 inch to about 30 inches, such as from about 2 inches to about 10 inches, such as from about 4 inches to about 8 inches. In at least one aspect, the mixture is sprayed onto the mylar sheet at a pressure of from about 7 psi to about 24 psi, such as from about 12 psi to about 18 psi. Other sprayer/pressure options can include: HVLP/LVLP from about 10 psi to about 60 psi; Air brushes from about 20 psi to about 50 psi; Hydraulic sprayers from about 500 psi to about 2000 psi; Robotic sprayers from about 100 to about 1000 psi. The nozzle of the spray apparatus is moved parallel to the surface of the mylar sheet. Two full movements of the nozzle parallel to the surface ("there and back") of the mylar sheet is referred to as one "pass". One pass can deposit the mixture onto the surface at a thickness of from about 0.5 mil to about 2 mil, such as from about 0.8 mil to about 1.2 mil, such as about 1 mil. A time period from one pass to a subsequent pass can be from about 0.1 minute to about 30 minutes, such as from about 0.5 minute to about 5 minutes, such as from about 1 minute to about 2 minutes. Providing time in between passes promotes solvent removal from layers deposited by individual passes. Furthermore, the deposited mixture can be cured in a stage-wise process as described above. Stage-wise curing of the present disclosure, after one or more of the passes, can promote removal of solvent from the layer of the pass to further reduce void content of compositions of the present disclosure.

The free-standing film can be hot pressed at a temperature of from about 90° C. to about 150° C., such as about 100° C. In at least one aspect, two platens are heated to the desired temperature (e.g., 100° C.). The free-standing film is placed between two release layers (e.g., silanized mylar) and placed in between the hot platens. The hot platens are then closed providing pressure and heat on the film. The thermoplastic will flow and the thickness of the film can be controlled with the use of shims. The platens are then cooled down before pressure is removed. The temperature chosen for hot pressing is dependent on the thermoplastic or polymer film. In at least one aspect, the temperature of the platens is above the Tg (glass transition temperature) of the polymer but below the decomposition temperature.

Bonding of Free Standing Film to Composition Coated Surface

As shown in FIG. 1, method 100 includes bonding the free standing film to the composition coated surface (block 114). The composition is the composition formed from the first polymer, second polymer, isocyanate, and curative, as described above. An adhesive can be applied to one or both of an exposed (e.g., outer) composition surface of the free standing film or an exposed (e.g., outer) composition surface of the composition coated component. The adhesive can be pressed with pressure onto one or both of the fluoropolymer surface of the free standing film or the composition surface of the composition coated component to reduce or eliminate air content between the adhesive and the applied surface. Adhesives include any suitable adhesive such as an epoxy, such as AF163-2K obtained from 3M Corporation. If the adhesive is applied to the fluoropolymer surface of the free standing film, a protective liner on the opposite surface of the adhesive is then removed and positioned over the composition surface of the composition coated component and then pressed with pressure onto the composition surface of the composition coated component. If the adhesive is applied to the composition surface of the composition coated component, a protective liner on the opposite surface of the adhesive is then removed and positioned over the composition surface of the free standing film and then pressed with pressure onto the composition surface of the free standing film.

Figure 4:
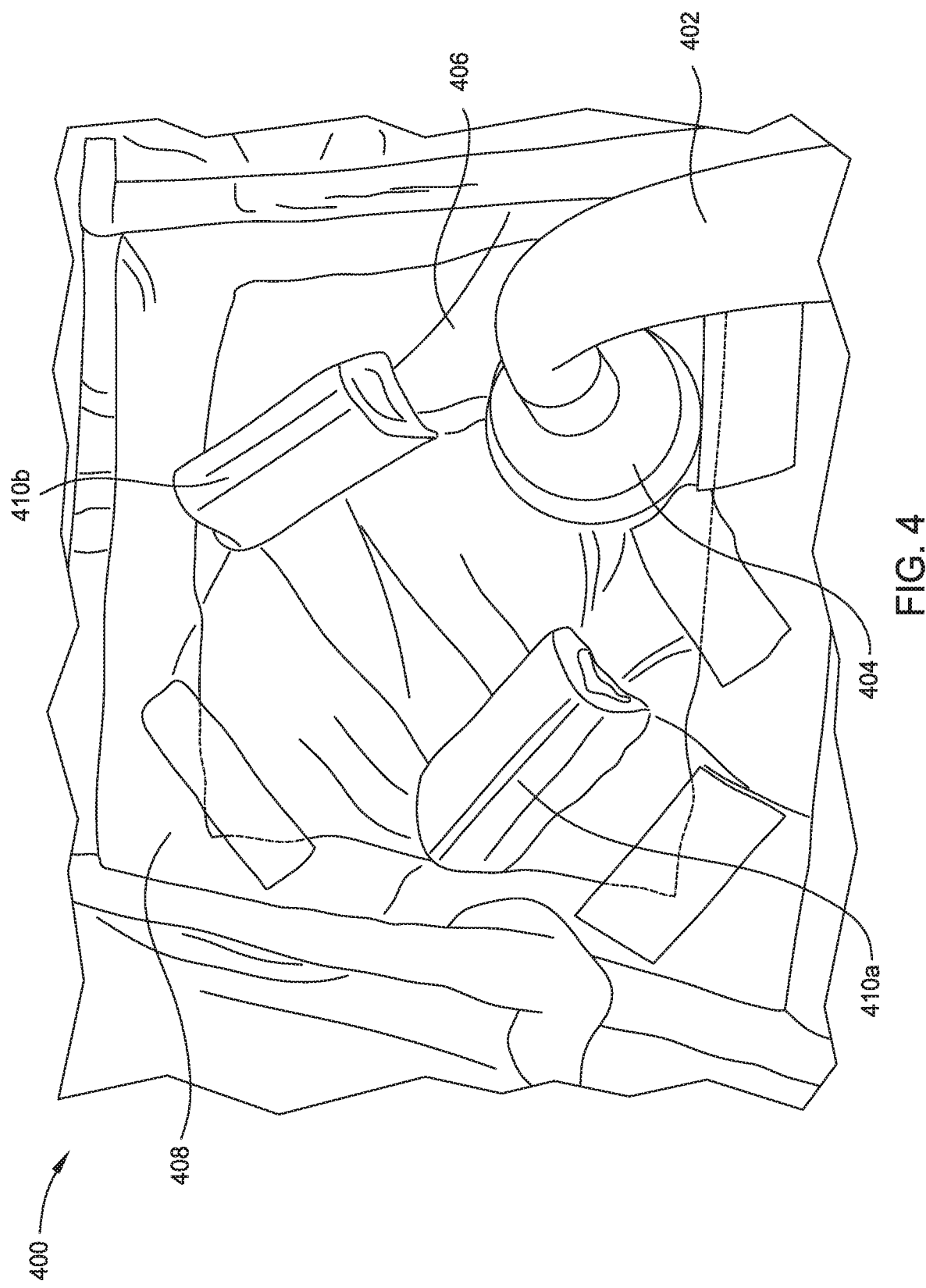
FIG. 4 is a perspective view of a vacuum bag apparatus, according to one aspect.

The entire (pressed) assembly is then sealed in a vacuum bag. FIG. 4 is a perspective view of a vacuum bag apparatus 400. As shown in FIG. 4, vacuum hose 402 is connected to vacuum seal 404. Vacuum seal 404 is connected to vacuum bag 406. Vacuum bag 406 is disposed on metal plate 408 and two assemblies shown at locations 410a and 410b. Metal plate 408 provides improved vacuum efficiency. The metal plate can be a flat metal plate and can comprise aluminium or stainless steel. It has been discovered that without the metal plate coupled to the vacuum bag, the vacuum bag wraps freely around the assembly creating voids and/or creases in the bag which, depending on the location of the creases and/or pleats, can affect the coating texture on the assembly.

A vacuum is applied to bag 406 ensuring contact with the free standing film to the composition coated metal of the assembly. A pressure inside bag 406 during a vacuum bagging process can be from about 1 psi to about 20 psi, such as from about 7 psi to about 10 psi. Once air is substantially or completely removed from the bond line between the free standing film and the composition coated metal of the assembly, the bagged assembly is transferred to an oven to cure the adhesive (of the pressed assembly), bring the composition to the 50° C. baseline temperature, and proceed with curing the composition in a stage-wise manner as described above, e.g. by incrementally increasing the temperature of the oven to control temperature increases and dwell times. After curing, excess film (if present) can be trimmed from the edges of the component. The vacuum bag can contain one or more breather materials, such as a porous cotton material, disposed within the vacuum bag. Breather material provides connection of the vacuum to the assembly surface.

After a vacuum bagging procedure, the assembly can have a composition (layer) of the present disclosure, as described above. For example, the composition can have a thickness of from about 10 mils to about 50 mils and an average void density of less than 5 voids of size 0.5 mm or greater per $cm^2$, such as less than 1 void of size 0.5 mm or greater per $cm^2$, as determined by optical microscopy, which can provide a smooth, conformal surface of the composition. In at least one aspect, the composition can have a surface roughness of less than about 100 microinches, such as less than about 90 microinches, such as less than about 80 microinches, such as less than about 70 microinches, such as from about 5 microinches to about 100 microinches, such as from about 20 microinches to about 80 microinches, as determined by ASTM D7127-05 (Standard Test Method for Measurement of Surface Roughness of Abrasive Blast Cleaned Metal Surfaces Using a Portable Stylus Instrument). The smooth composition layers of the present disclosure can provide stable laminar flow of water over the fluoropolymer layer, for improved rain erosion and sand erosion.

Additives for Improving Coating Behavior

While adding additives to paints and coatings is common knowledge in the industry, it is important to retain the anti-ice performance of the coating. Many additives can be used to produce smoother finishes, better wetting of the surface being coated and better resistance to environmental effects and conditions such as moisture, heat and UV exposure. Some of these additives work by modifying the surface energy of the coating composition which can alter the microstructure of any incompatible chemistry composition. The microstructure and phase separation of the incompatible chemistries is important to having high anti-ice performance and should not be altered significantly. These additives may also migrate to the surface of the coating which can change how ice interacts with the surface of the coating which can also effect freezing delays and ice adhesion.

The chemical nature of the components in the coating technology readily absorb moisture from the environment, which may cause premature curing of the coating and the production of carbon dioxide. To mitigate this issue, moisture scavengers (e.g. oxazolidines such Incozol-2) can be added to the mixtures of first polymer, second polymer, isocyanate, curative, and/or solvent of the present disclosure. To improve surface wetting and spreading of the coating on the component, a wetting agent (e.g., block copolymers such as Disperbyk-166 which is a high molecular weight block copolymer with pigment affinic groups) and/or defoamer (e.g. BYK-051N, which is a silicone-free defoamer) can be included in a mixture of first polymer, second polymer, isocyanate, curative, and/or solvent of the present disclosure. These additives are not particulates, but are small molecule additives. They are moisture scavengers or reduce void formation. Lower amount of voids promotes the integrity/strength of the film. Voids can be observed macroscopically using microscopy.

Additives of the present disclosure include any suitable moisture scavenger, wetting agent, and/or defoamer. Moisture scavengers can include isophorone diisocyanate (IPDI)

and oxazolidines (such as 4-Ethyl-2-methyl-2-(3-methyl-butyl)-1,3-oxazolidine). Wetting agents can include polyamides, polyamides having long chain fatty acid moieties, and p-Dodecylbenzenesulfonic acid (DDBSA). Defoamers can include poly(dimethylsiloxane) fluids, poly(octyl acrylates), $SiO_2$, siloxanes with a polyether terminal group, and potassium tripolyphosphate.

Due to the enhancements in processing fluoropolymer coatings of the present disclosure, it has been discovered that the amount of these additives can be reduced or eliminated from the coatings of the present disclosure as compared to fluoropolymer coatings prepared using conventional deposition and curing methodology. In at least one aspect, a fluoropolymer layer of the present disclosure has an additive content of less than about 1 wt %, such as less than about 0.5 wt %, which saves manufacturing time and cost as compared to higher additive contents of conventional anti-ice layers; and is an amount sufficiently low to reduce or prevent accumulation of the additives at the composition surface ("waxing out").

Airfoils

As used herein, "airfoil" comprises a substrate in the shape of a wing or a blade (of a propeller, rotor, or turbine). Airfoils may include rotor blades, static wing surfaces of rotorcraft or fixed wing aircraft, or blades of a wind turbine. Airfoils, such as rotor blades, comprise one or more surfaces, such as an outer surface, and one or more components as described in more detail below. As described herein, "airfoil component" comprises any suitable structure adapted, in combination with one or more other airfoil components, to form an airfoil.

Figure 5:
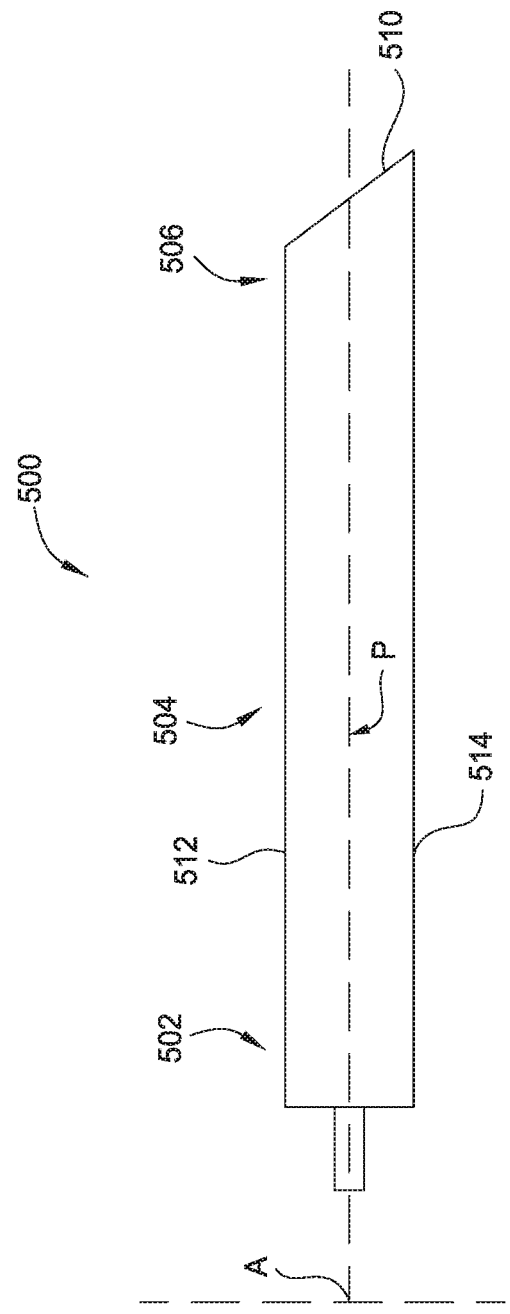
FIG. 5 is a perspective view of a rotor blade, according to some aspects of the present disclosure.

Airfoil components of the present disclosure that are rotor blades comprise one or more rotor blade components. As described herein, "rotor blade component" comprises any suitable adapted, in combination with one or more other rotor blade components, to form a rotor blade. FIG. 5 is a perspective view of a rotor blade, according to some aspects of the present disclosure. As shown in FIG. 5, rotor blade 500 of a main rotor assembly (not shown) is made of a root section 502, an intermediate section 504, and a tip section 506. Each of sections 502, 504, 506 is any suitable geometry to tailor rotor blade aerodynamics to the velocity increase along the rotor blade span. Rotor blade tip section 506 comprises an angled geometry such as anhedral, cathedral, gull, and bent, among others. Rotor blade sections 502, 504, 506 define a span of rotor blade 500 between the axis of rotation A and a distal end 510 of tip section 506 along a longitudinal axis P between a first edge 512 and a second edge 514. Compositions of the present disclosure can be disposed on one or more components of a rotor blade, such as rotor blade 500.

Aspects

Clause 1. A coating disposed on a surface, the coating comprising the reaction product of:
a first polymer;
a second polymer that is a fluoropolymer;
an isocyanate; and
a curative, the coating having (such as a 1 cm² portion of the coating has) a thickness of from about 10 mils to about 50 mils and a void density of less than 5 voids of size 0.5 mm or greater per cm².

Clause 2. The coating of Clause 1, wherein the coating has a void density of less than 1 void of size 0.5 mm or greater per cm².

Clause 3. The coating of Clauses 1 or 2, wherein the coating has (1) a coating rain erosion rate of 0.5 mil/50 mins or less at 400 mph or (2) a sand loading erosion of 50 g/cm² or higher at a 20 mil thickness at 500 mph at an impact angle of 20 degrees.

Clause 4. The coating of any of Clauses 1 to 3, wherein the coating has an ice adhesion reduction factor of about 25 or more.

Clause 5. The coating of any of Clauses 1 to 4, wherein the fluoropolymer is selected from a polyfluoroether, a perfluoropolyether, a polyfluoroacrylate, a polyfluorosiloxane, a polytetrafluoroethylene, a polyvinylidene difluoride, a polyvinylfluoride, a polychlorotrifluoroethylene, a copolymer of ethylene and trifluoroethylene, a copolymer of ethylene and chlorotrifluoroethylene, or combinations thereof.

Clause 6. The coating of any of Clauses 1 to 5, wherein the fluoropolymer is a perfluoropolyether.

Clause 7. The coating of any of Clauses 1 to 6, wherein the fluoropolymer is represented by Formula (I):

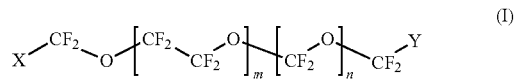

wherein:
X and Y are independently —$CH_2$—(O—$CH_2$—$CH_2$)$_p$—OH or —$CH_2$—(O—$CH_2$—$CH_2$)$_p$—$NH_2$ wherein p is an integer from 0 to 50;
m=1 to 100; and
n=1 to 100.

Clause 8. The coating of any of Clauses 1 to 7, wherein the fluoropolymer has a number average molecular weight of from about 500 g/mol to about 10,000 g/mol.

Clause 9. The coating of any of Clauses 1 to 8, wherein the coating has a surface roughness of from about 5 microinches to about 100 microinches.

Clause 10. The coating of any of Clauses 1 to 9, wherein the first polymer is selected from poly(acrylic acid), poly (ethylene glycol), poly(2-hydroxyethyl methacrylate), poly (vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, PEG polyacrylates (e.g., triacrylates or greater), or combinations thereof.

Clause 11. The coating of any of Clauses 1 to 10, wherein the first polymer is a polyester or a polyether.

Clause 12. The coating of any of Clauses 1 to 11, wherein the first polymer is selected from poly(oxymethylene), poly (ethylene glycol), poly(propylene glycol), poly(tetrahydrofuran), poly(glycolic acid), poly(caprolactone), poly(ethylene adipate), poly(hydroxybutyrate), poly (hydroxyalkanoate), or combinations thereof.

Clause 13. The coating of any of Clauses 1 to 12, wherein the first polymer is poly(ethylene glycol).

Clause 14. The coating of any of Clauses 1 to 13, wherein the first polymer is a first phase and the second polymer is a second phase within the first phase.

Clause 15. The coating of any of Clauses 1 to 14, further comprising one or more of a particulate filler, a pigment, a dye, a plasticizer, a flame retardant, a flattening agent, and a substrate adhesion promoter.

Clause 16. The coating of any of Clauses 1 to 15, wherein the coating comprises a particulate filler selected from silica, alumina, silicates, talc, aluminosilicates, barium sulfate, mica, diatomite, calcium carbonate, calcium sulfate, carbon, wollastonite, or combinations thereof.

Clause 17. The coating of any of Clauses 1 to 16, wherein the coating has elongation of from about 300% to about 1,000%.

Clause 18. The coating of any of Clauses 1 to 17, wherein the coating has a tensile strength of from about 30 MPa to about 90 MPa.

Clause 19. An engine inlet lip comprising the coating of any of Clauses 1 to 18 disposed thereon.

Clause 20. A method for forming a coating, comprising:
applying a composition to a surface of a component, the composition comprising:
a first polymer,
a second polymer that is a fluoropolymer,
an isocyanate, and
a curative;
curing the mixture at a first temperature of about 50° C. or greater;
increasing the first temperature to a second temperature of about 80° C. or greater; and
obtaining a coating disposed on the surface of the component, wherein the coating having (such as a 1 cm$^2$ portion of the coating has) a thickness of from about 10 mils to about 50 mils and a void density of less than 5 voids of size 0.5 mm or greater per cm$^2$.

Clause 21. The method of Clause 20, wherein the composition further comprises a tin catalyst.

Clause 22. The method of Clauses 20 or 21, wherein the tin catalyst is dibutyltin dilaurate.

Clause 23. The method of any of Clauses 20 to 22, wherein the composition further comprises a solvent having a boiling point of from about 50° C. to about 200° C. and the solvent comprises about 20 wt % or less of the composition based on the weight of the composition.

Clause 24. The method of any of Clauses 20 to 23, wherein the solvent is an ester solvent.

Clause 25. The method of any of Clauses 20 to 24, wherein the ester solvent is ethyl acetate, n-butyl acetate, or a mixture thereof.

Clause 26. The method of any of Clauses 20 to 26, wherein the solvent is toluene.

Clause 27. The method of any of Clauses 20 to 26, wherein the solvent is a fluorinated solvent.

Clause 28. The method of any of Clauses 20 to 27, wherein the fluorinated solvent is 4-chlorobenzotrifluoride, 1,3-bis(trifluoromethyl)benzene, or a mixture thereof.

Clause 29. The method of any of Clauses 20 to 28, further comprising increasing the second temperature to a third temperature of about 100° C. or greater.

Clause 30. The method of any of Clauses 20 to 29, wherein curing the mixture at the first temperature is performed for from about 5 minutes to about 2 hours.

Clause 31. The method of any of Clauses 20 to 30, wherein increasing the first temperature to the second temperature is performed at a ramp rate of about 0.5° C./min to about 2° C./min followed by holding the second temperature for from about 5 minutes to about 10 hours.

Clause 32. The method of any of Clauses 20 to 31, wherein increasing the second temperature to the third temperature is performed at a ramp rate of about 0.5° C./min to about 2° C./min followed by holding the third temperature for from about 5 minutes to about 2 hours.

Clause 33. An airfoil comprising:
a root section comprising a first surface;
an intermediate section comprising a first surface and coupled with the root section at a first end;
a tip section comprising a first surface and coupled at a first end with a second end of the intermediate section; and
a coating adjacent at least one of the first surface of the root section, the first surface of the intermediate section, and the first surface of the tip section, the coating comprising the reaction product of:
a first polymer;
a second polymer that is a fluoropolymer;
an isocyanate; and
a curative, the coating having a thickness of from about 10 mils to about 50 mils and a void density of less than 5 voids of size 0.5 mm or greater per cm$^2$.

Clause 34. The airfoil of Clause 33, wherein the coating is adjacent the first surface of the tip section.

EXAMPLES

One improvement over prior techniques was to shift from heavily diluting the resin and spray coating to adding a modest amount of solvent (less than or equal to 20 wt % with respect to solids) to maintain a flowable resin viscosity and casting onto a film surface. The solvent used for dilution and casting with these systems was n-butyl acetate. Surfaces used were most commonly non-stick surfaces, such as a silanized Mylar film. Some other non-stick release surfaces that would be acceptable include fluorinated surfaces such as Teflon aka poly(tetrafluoroethylene), PVDF aka poly(vinyldifluoride), and Tedlar aka poly(vinyl fluoride). Films were cast onto Mylar using a doctor blade with film thickness set for 20 mils.

The viscous resin was promptly poured from the reaction vessel after curative addition onto a surface where the film thickness was controlled through techniques such as a draw down bar used with shims, a doctor blade or a Meyer rod. Larger scale continuous processes can be envisioned where resin is dispensed through a gap such as a slot die onto a continuously fed roll to roll film.

Following the drawing out of a film of a controlled thickness, the film was then placed in an oven or heated chamber to both evolve solvent and effect cure of the material. Inert gas environments were preferred but were not necessary. The cure profile was designed to produce a graceful evolution of the solvent from the film thus avoiding void formation. The goal was to steadily evaporate solvent to concentrate the film down to 100% solids but not so fast that solvent was trapped underneath the surface upon gelation/solidification of the film leading to voids as with conventional spray techniques. A significant contribution to the success in this respect was the boiling point or vapor pressure of solvent with respect to the surrounding temperature of the film. Earlier examples with spray coating and tetrahydrofuran (boiling point 70° C.) as solvent were found to be too volatile even at room temperature and prone to forming voids. High boiling point solvents such as n-butyl acetate (126° C.) were found to be much less prone to void formation even under elevated temperature conditions in addition to being able to mix with the high fluoropolymer resin.

The cure profile was also found to be important to a graceful evolution of solvent from the coating during cure. The goal was to elevate the temperature in order to help drive curing at a reasonable rate but not so aggressively that it caused solvent to boil or flash off so rapidly in the coating leading to void formation in the coating. Staged curing profiles given below in the two examples are representative of exemplary cure schedules.

Upon curing, the films were removed from the non-stick release layer and able to be handled as free standing films. Films were then bonded to surfaces using a variety of bonding strategies including 1. Standard epoxy adhesives (Hysol 9309, 9394, 9377)
2. Film adhesives (3M AF-163)
3. Pressure sensitive adhesives (3M 9379)

In certain cases such as that of the film adhesives, vacuum bag techniques are desired to apply pressure on the substrate during heating and curing which was found to effect a high quality bond.

In certain cases where bonding to heavily fluorinated surfaces such as these is insufficient for a desired purpose, a surface pretreatment can be carried out by expose of the film surface to a Sodium Napthalide based etchant (Fluoroetch, Acton Technologies).

Sample 1

Experimental

Materials: Poly(ethylene glycol) 3350 (PEG Mn=3350 g/mol), 4,4'-methylenebis(cyclohyxyl isocyanate) mixture of isomers (HMDI), 1,4-butanediol (BD), and dibutyltin dilaurate (DBTDL) were obtained from Sigma Aldrich. PEG was freeze-dried. Fluorolink D4000 (E10-H Mn=1930 g/mol) was obtained from Solvay and dried in vacuum oven at ~50-60° C. for 2 hours under nitrogen. n-Butyl acetate (nBA) was obtained from Sigma Aldrich and dried over molecular sieves prior to use.

Stoichiometry: PEG/HMDI/D4000/BD in a 1/10/1/8 molar ratio, with 200 ppm DBTBL as the catalyst.

Procedure: A 100 mL two-neck or 250 mL 3-neck round-bottom flask was heated in 120° C. oven for at least one hour to drive off residual water and then cooled under inert gas (Ar or N$_2$). PEG (30 g, 8.96 mmole) and HMDI (23.46 g, 89.6 mmole) are added to flask and brought to 100° C. in silicone oil bath while stirred at approximately 30 rpm. After the PEG had melted (approximately 10 minutes), DBTBL was added and the reaction was left to proceed for 1 hour at 300 rpm stir rate. After the 1 hour, D4000 (35.84 g, 8.96 mmole) was added and left to react for 1 hour. The BD (6.45 g, 71.68 mmole) was weighed in a jar, drawn up in syringe and the jar is flushed with ~1 mL nBA (for 1-3 g BD systems). The reaction was removed from heat and allowed to cool to approx. 30-40° C. Approximately 15 phr or 15 wt % of nBA was slowly added 1 ml at a time as the reaction flask cooled. The 1 mL nBA/BD flush was added to the flask followed by the BD. The reaction was left to stir at 300 rpm for ~30 seconds and then cast onto silanized Mylar affixed to a glass plate and drawn down with glass rod. The cast film was then placed in 50° C. oven under nitrogen and ramped using the following cure schedule:

Cure Schedule: The film was added to a preheated 50° C. oven and underwent the following:

50° C. for 1 hour
Ramp to 80° C. over 20 minutes. Hold at 80° C. for 4 hours.
Ramp to 100° C. over 20 minutes. Hold at 100° C. for 30 minutes.
Cool to room temperature.

Mechanicals: Mechanical properties of the films (n=5) were tested on an Instron 5840 using a crosshead speed of 3 mm/min. Results: Elongation 444±40% and Tensile Strength 55.3±8.3 MPa.

Sample 2

Experimental

Materials: Poly(ethylene glycol) 3350 (PEG Mn=3350 g/mol), 4,4'-methylenebis(cyclohyxyl isocyanate) mixture of isomers (HMDI), 1,4-butanediol (BD), and dibutyltin dilaurate (DBTDL) were obtained from Sigma Aldrich. PEG was freeze-dried using LABCONCO freeze dryer equipment at <50 Papressure and <−75° C. temperature for 12+ hours. Fluorolink E10-H (E10-H Mn=1930 g/mol) was obtained from Solvay and dried in vacuum oven at ~100° C. for 2 hours under nitrogen. n-Butyl acetate (nBA) was obtained from Sigma Aldrich and dried over molecular sieves prior to use.

Stoichiometry: PEG/HMDI/E10H/BD in a 1/6.4/1/4.4 ratio, with 200 ppm DBTBL as the catalyst. The following chart can be used for ease of calculation based off PEG mass:

| | Molar ratio | Molar mass | Mass | Actual mass |
|---|---|---|---|---|
| PEG 3350 | 1 | 3350 | 3350 | X |
| HMDI | 6.4 | 262.35 | 1679.04 | X*1679.04/3350 |
| E10-H | 1 | 1930 | 1930 | X*1930/3350 |
| BD | 4.4 | 90.12 | 396.528 | X*396.528/3350 |
| DBTBL | 200 ppm | | | 131*X/318 uL |

Procedure: A 100 mL two-neck round-bottom flask was heated in 120° C. oven for approximately an hour to drive off residual water and then cooled under inert gas (Ar or N$_2$). PEG (30 g, 8.96 mmole) an HMDI (15.03 g, 57.39 mmole) were added to the flask and brought to 100° C. in silicone oil bath while stirred at 30 rpm. After the PEG had melted (approximately 10 minutes), DBTBL was added and the reaction was left to proceed for 1 hour at 300 rpm stir rate. After the 1 hour, E10-H (17.28 g, 8.96 mmole) was added and left for 2 hours. The BD (3.55 g, 39.46 mmole) is weighed in jar, drawn up in syringe and the jar was flushed with ~1 mL nBA (for 1-3 g BD systems). The reaction was removed from heat and allowed to cool to approx. 60° C. The 1 mL nBA/BD flush is added to the flask followed by the BD. The reaction was left to stir at 300 rpm for 1 minute and then cast onto silanized mylar. The cast film was then placed in 50° C. oven under nitrogen and ramped using the following cure schedule:

Cure Schedule: The film was added to a preheated 50° C. oven and underwent the following:

50° C. for 1 hour
Ramp to 80° C. over 20 minutes. Hold at 80° C. for 4 hours.
Ramp to 100° C. over 20 minutes. Hold at 100° C. for 30 minutes.
Cool to room temperature.
Mechanicals: Mechanical properties of the films (n=5) were tested on an Instron 5840 using a crosshead speed of 3 mm/min. Results: Elongation 663±26% and Tensile Strength 83.7±4.9 MPa.

Sand and Rain Erosion Testing

A primary benefit of creating icephobic coatings with excellent mechanical properties is their resistance to high speed sand and rain. In order to fully test this, small airfoils were coated and sent to the University of Dayton Research Institute for testing on their Particle Erosion Test Rig (PETR) and Rain Rig.

Description of UDRI Rain rig: The "rain rig" is an 8-foot-diameter rotating arm and 96 calibrated needles are used to simulate flight in a 1 inch per hour rainfall. Coupon specimens are tested at speeds up to 650 mph. Real-time video is monitored and recorded, allowing "time to failure" testing.

Figure 6:
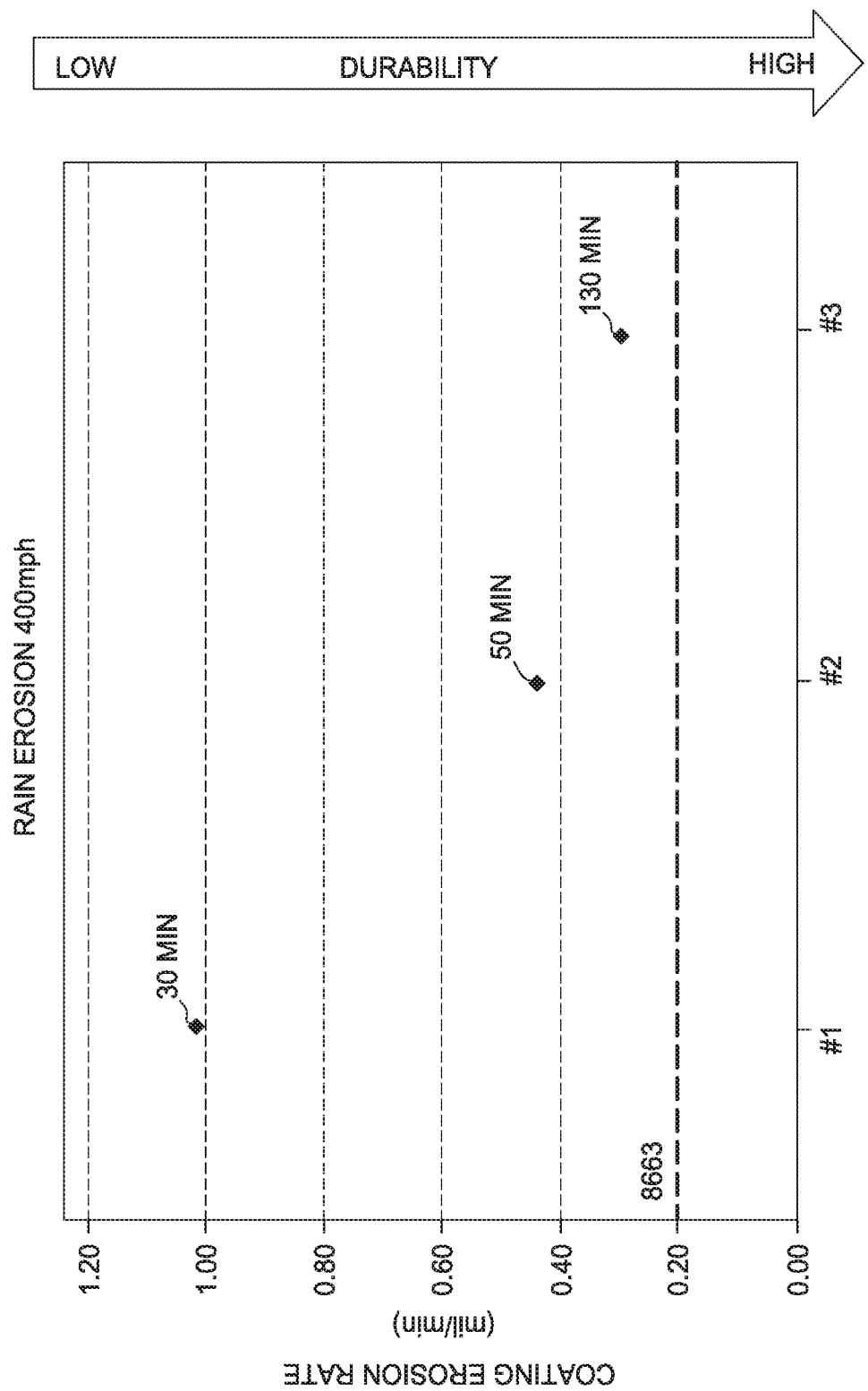
FIG. 6 is a graph illustrating rain erosion testing (coating erosion rate) performed at 400 mph, according to one aspect.

FIG. 6 is a graph illustrating rain erosion testing (coating erosion rate) performed at 400 mph. All samples were Sample #1 with Test sample #1 sprayed and bonded with 3M AF163 film adhesive. Test sample #2 was cast and bonded with 3M AF163 film adhesive. Finally, Test sample #3 was bonded with 3M 9379 double sided pressure sensitive adhesive. Rain erosion performance was compared against 3M 8663 leading edge erosion protection tape.

Sand erosion: "Dust rig": The "dust rig" was designed and developed in 1983 to simulate erosion effects on aircraft surfaces subjected and has been recently upgraded to test the larger mass loading seen by helicopter rotors. Typically, crushed silica (e.g., angular quartz) in sizes ranging from 240 microns to 550 microns (known as "golf sand") is used as the test media. Specimens are translated in front of an oscillating nozzle. The 6-inch square test area is uniformly covered with a pre-determined mass of particles of a known size at a measured speed up to 500 mph. Impact angles from normal to 20 degrees (70 degrees angle of incidence) can be tested, and many specimen configurations are possible. A calibrated screw feed in a plenum tank and an electronic pressure controller ensure correct mass delivery and stability, and a laser Doppler anemometry system is used to determine a delivery pressure for the required velocity.

Figure 7:
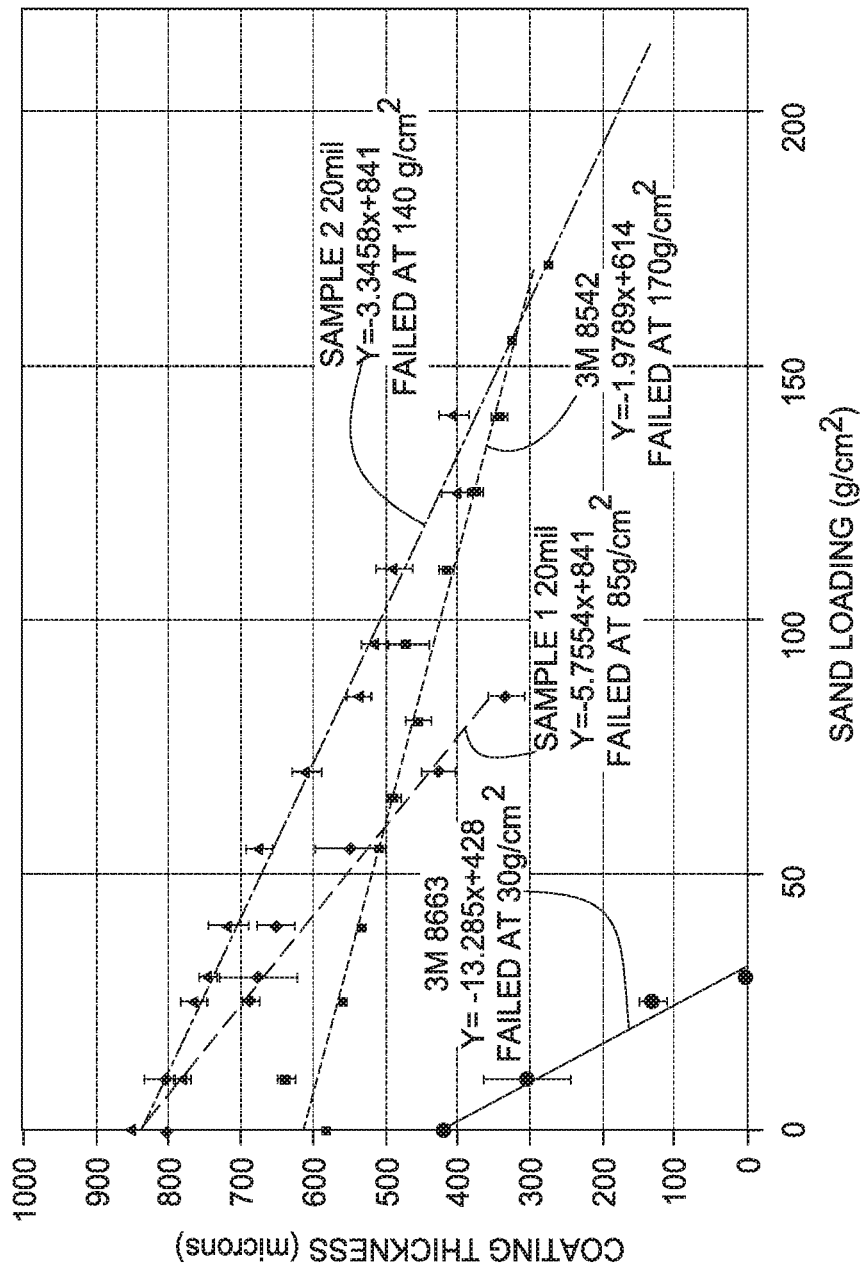
FIG. 7 is a graph illustrating 500 mph sand impacted onto 20 mil thick coated airfoils and reduction in coating thickness measured at specific mass loading levels of impacted sand, according to one aspect.

FIG. 7 is a graph illustrating 500 mph sand impacted onto 20 mil thick coated airfoils and reduction in coating thickness measured at specific mass loading levels of impacted sand. 3M 8663 and 8542 leading edge erosion protection tapes were run as controls and failed based on coating breakthrough at 30 and 170 g/cm² respectively. Samples #1 and #2 failed at 85 g/cm² and 140 g/cm² respectively, losing thickness in a graceful controlled manner reflective of tough durable coatings.

Overall, methods of the present disclosure provide smooth icephobic coatings on surfaces with improved rain and sand erosion resistance. Although generally discussed in the context of aviation use, other possible uses of methods of the present disclosure are contemplated, such as on wind turbine blades, in non-aerospace transportation, and in communications, including satellite dishes.

Definitions

The term "alkyl" includes a substituted or unsubstituted, linear or branched acyclic alkyl radical containing from 1 to about 20 carbon atoms. In at least one aspect, alkyl is a $C_{1-10}$alkyl, $C_{1-7}$alkyl or $C_{1-5}$alkyl. Examples of alkyl include, but are not limited to, methyl, ethyl, propyl, butyl, pentyl, hexyl, heptyl, octyl, nonyl, decyl, and structural isomers thereof.

The term "cycloalkyl" includes a substituted or unsubstituted, cyclic alkyl radical containing from 3 to about 20 carbon atoms.

The term "hydroxy" and "hydroxyl" each refers to —OH.

The term "amine" or "amino" refers to a primary, secondary or tertiary amine-containing radical. An example of an amino radical is —NH₂. An amino radical may be substituted with $R^4$ or $R^5$ (e.g., 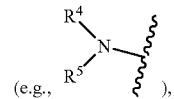 ), where $R^4$ may be, for example, cyano, haloacyl, alkenylcarbonyl, hydroxyalkenylcarbonyl, aminoalkenylcarbonyl, monoalkylaminoalkenylcarbonyl, dialkylaminoalkenylcarbonyl, haloalkenylcarbonyl, cyanoalkenylcarbonyl, alkoxycarbonylalkenylcarbonyl, alkynylcarbonyl, hydroxyalkynylcarbonyl, alkylcarbonylalkenylcarbonyl, cycloalkylcarbonylalkenylcarbonyl, arylcarbonylalkenylcarbonyl, aminocarbonylalkenylcarbonyl, monoalkylaminocarbonylalkenylcarbonyl, dialkylaminocarbonylalkenylcarbonyl or alkenylsulfonyl; and $R^5$ may be, for example, H, alkyl or cycloalkyl.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E- geometric isomers), R- and S-enantiomers, diastereomers, d-isomers, l-isomers, atropisomers, epimers, conformers, rotamers, mixtures of isomers and racemates thereof are embraced by the present disclosure.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:
1. A coating for coating a surface, the coating comprising:
a polyurethane that is a product of:
  a first polymer;
  a fluoropolymer;
  an isocyanate; and
  a curative; and
a defoamer selected from the group consisting of poly (dimethylsiloxane), poly(octyl acrylate), silicon dioxide, a siloxane having a polyether terminal group, potassium tripolyphosphate, and combinations thereof, wherein the coating has a defoamer content of less than 1 wt %;
wherein the polyurethane has a first phase comprising the first polymer and a second phase comprising the fluoropolymer disposed within the first phase, wherein the first phase is a major phase comprising the first polymer and the second phase comprises a plurality of inclusions of the fluoropolymer, wherein the plurality of inclusions is disposed within the first phase;
wherein the coating has a thickness of about 10 mils to about 50 mils, a void density of less than 5 voids of size 0.5 mm or greater per cm$^2$, and an ice adhesion reduction factor of about 25 or more.

2. The coating of claim 1, wherein the coating has a void density of less than 1 void of size 0.5 mm or greater per cm$^2$.

3. The coating of claim 1, wherein the coating has (1) a coating rain erosion rate of 0.5 mil/50 mins or less at 400 mph or (2) a sand loading erosion of 50 g/cm$^2$ or higher at a 20 mil thickness at 500 mph at an impact angle of 20 degrees.

4. The coating of claim 1, wherein the fluoropolymer is selected from the group consisting of a polyfluoroether, a perfluoropolyether, a polyfluoroacrylate, a polyfluorosiloxane, a polytetrafluoroethylene, a polyvinylidene difluoride, a polyvinylfluoride, a polychlorotrifluoroethylene, a copolymer of ethylene and trifluoroethylene, a copolymer of ethylene and chlorotrifluoroethylene, and combinations thereof.

5. The coating of claim 4, wherein the fluoropolymer is a perfluoropolyether.

6. The coating of claim 1, wherein the fluoropolymer is represented by Formula (I):

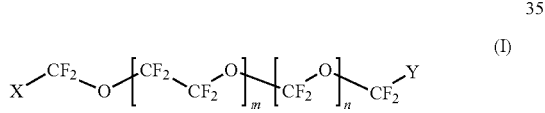

wherein:
X and Y are independently —CH$_2$—(O—CH$_2$—CH$_2$)$_p$—OH or —CH$_2$—(O—CH$_2$—CH$_2$)$_p$—NH$_2$ wherein p is an integer from 0 to 50;
m=1 to 100; and
n=1 to 100.

7. The coating of claim 1, wherein the fluoropolymer has a number average molecular weight of about 500 g/mol to about 10,000 g/mol.

8. The coating of claim 1, wherein the coating has a surface roughness of about 5 microinches to about 100 microinches.

9. The coating of claim 1, wherein the first polymer is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, PEG polyacrylates (e.g., triacrylates or greater), and combinations thereof.

10. The coating of claim 1, wherein the first polymer is a polyester or a polyether.

11. The coating of claim 1, wherein the first polymer is selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

12. The coating of claim 11, wherein the first polymer is poly(ethylene glycol).

13. The coating of claim 1, further comprising one or more of a particulate filler, a pigment, a dye, a plasticizer, a flame retardant, a flattening agent, and a substrate adhesion promoter.

14. The coating of claim 13, wherein the coating comprises a particulate filler selected from the group consisting of silica, alumina, silicates, talc, aluminosilicates, barium sulfate, mica, diatomite, calcium carbonate, calcium sulfate, carbon, wollastonite, and combinations thereof.

15. The coating of claim 1, wherein the coating has elongation of about 300% to about 1,000%.

16. The coating of claim 1, wherein the coating has tensile strength of about 30 MPa to about 90 MPa.

17. The coating of claim 1, wherein an average distance between the inclusions of the fluoropolymer is about 0.5 microns to about 100 microns.

18. The coating of claim 17, wherein an average distance between the inclusions of the fluoropolymer is about 1 micron to about 50 microns.

19. The coating of claim 1, wherein a molar ratio of the first polymer to the fluoropolymer is about 0.1:1 to about 1:1.

20. The coating of claim 1, wherein:
a molar ratio of the first polymer to the fluoropolymer is about 0.1:1 to about 1:1;
the first polymer is poly(ethylene glycol) or poly(propylene glycol);
an average distance between the inclusions of the fluoropolymer is about 1 micron to about 50 microns;
the coating has elongation of about 300% to about 1,000%; and
the coating has tensile strength of about 30 MPa to about 90 MPa.

21. The coating of claim 1, wherein the polyurethane is cured in the presence of a tin catalyst.

22. An airfoil comprising:
a root section comprising a first surface;
an intermediate section comprising a first surface and coupled with the root section at a first end;
a tip section comprising a first surface and coupled at a first end with a second end of the intermediate section; and
a coating adjacent at least one of the first surface of the root section, the first surface of the intermediate section, or the first surface of the tip section, the coating comprising:
a polyurethane that is a product of:
a first polymer;
a fluoropolymer;
an isocyanate; and
a curative; and
a defoamer selected from the group consisting of poly(dimethylsiloxane), poly(octyl acrylate), silicon dioxide, a siloxane having a polyether terminal group, potassium tripolyphosphate, and combinations thereof, wherein the coating has a defoamer content of less than 1 wt %;
wherein the polyurethane has a first phase comprising the first polymer and a second phase comprising the fluoropolymer disposed within the first phase, wherein the first phase is a major phase comprising the first polymer and the second phase comprises a plurality of inclusions of the fluoropolymer, wherein the plurality of inclusions is disposed within the first phase;

wherein the coating has a thickness of about 10 mils to about 50 mils and a void density of less than 5 voids of size 0.5 mm or greater per $cm^2$, and an ice adhesion reduction factor of about 25 or more.

23. The airfoil of claim 22, wherein the coating is adjacent the first surface of the tip section.

24. A method for forming a coating, said method comprising:

applying a composition to a surface of a component, the composition comprising:
- a first polymer,
- a fluoropolymer,
- an isocyanate,
- a curative, and
- a defoamer selected from the group consisting of poly(dimethylsiloxane), poly(octyl acrylate), silicon dioxide, a siloxane having a polyether terminal group, potassium tripolyphosphate, and combinations thereof;

curing the composition at a first temperature of about 50° C. or greater;

increasing the first temperature to a second temperature of about 80° C. or greater; and obtaining the coating disposed on the surface of the component, the coating having a defoamer content of less than 1 wt %, a thickness of about 10 mils to about 50 mils, a void density of less than 5 voids of size 0.5 mm or greater per $cm^2$, and an ice adhesion reduction factor of about 25 or more, wherein the coating comprises a polyurethane that is a product of the composition, the polyurethane having a first phase comprising the first polymer and a second phase comprising the fluoropolymer, wherein the first phase is a major phase comprising the first polymer and the second phase comprises a plurality of inclusions of the fluoropolymer, wherein the plurality of inclusions is disposed within the first phase.

25. The method of claim 24, wherein the composition is cured in the presence of a tin catalyst.

26. The method of claim 25, wherein the tin catalyst is dibutyltin dilaurate.

27. The method of claim 24, wherein the composition further comprises a solvent having a boiling point of about 50° C. to about 200° C. and the solvent comprises about 20 wt % or less of the composition based on the weight of the composition.

28. The method of claim 27, wherein the solvent is an ester solvent.

29. The method of claim 28, wherein the ester solvent is ethyl acetate, n-butyl acetate, or a mixture thereof.

30. The method of claim 27, wherein the solvent is toluene.

31. The method of claim 27, wherein the solvent is a fluorinated solvent.

32. The method of claim 31, wherein the fluorinated solvent is 4-chlorobenzotrifluoride, 1,3-bis(trifluoromethyl)benzene, or a mixture thereof.

33. The method of claim 24, further comprising increasing the second temperature to a third temperature of about 100° C. or greater.

34. The method of claim 24, wherein curing the composition at the first temperature is performed for from about 5 minutes to about 2 hours.

35. The method of claim 34, wherein increasing the first temperature to the second temperature is performed at a ramp rate of about 0.5° C./min to about 2° C./min followed by holding the second temperature for from about 5 minutes to about 10 hours.

36. The method of claim 33, wherein increasing the second temperature to the third temperature is performed at a ramp rate of about 0.5° C./min to about 2° C./min followed by holding the third temperature for from about 5 minutes to about 2 hours.

* * * * *

UNITED STATES PATENT AND TRADEMARK OFFICE
CERTIFICATE OF CORRECTION

PATENT NO. : 11,214,707 B2  
APPLICATION NO. : 16/138718  
DATED : January 4, 2022  
INVENTOR(S) : Andrew P. Nowak et al.

Page 1 of 1

It is certified that error appears in the above-identified patent and that said Letters Patent is hereby corrected as shown below:

In the Claims

In Column 23, Line 57, in Claim 9, delete "poly(vinylpyrolidone)," and insert -- poly(vinylpyrrolidone), --.

In Column 23, Line 60, in Claim 9, delete "diacryalate," and insert -- diacrylate, --.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*